US011701978B2

(12) United States Patent
Maurer et al.

(10) Patent No.: US 11,701,978 B2
(45) Date of Patent: Jul. 18, 2023

(54) BATTERY DRONE

(71) Applicant: Alarm.com Incorporated, Tysons, VA (US)

(72) Inventors: Kevin Maurer, Tysons, VA (US); Alison Jane Slavin, Falls Church, VA (US); Aaron Lee Roberts, Centreville, VA (US); Shan Huang, Fairfax, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/471,714

(22) Filed: Sep. 10, 2021

(65) Prior Publication Data
US 2022/0029438 A1 Jan. 27, 2022

Related U.S. Application Data

(63) Continuation of application No. 16/420,531, filed on May 23, 2019, now Pat. No. 11,133,684.
(Continued)

(51) Int. Cl.
*B60L 53/16* (2019.01)
*B64C 39/02* (2023.01)
(Continued)

(52) U.S. Cl.
CPC ............... *B60L 53/16* (2019.02); *B60L 53/36* (2019.02); *B64C 39/024* (2013.01); *G05D 1/101* (2013.01);
(Continued)

(58) Field of Classification Search
CPC ...... B60L 53/36; B60L 53/16; B60L 2200/10; B64C 39/024; B64C 2201/066;
(Continued)

(56) References Cited

U.S. PATENT DOCUMENTS 8,350,526 B2  1/2013 Dyer et al.
9,440,545 B2  9/2016 Wang
(Continued)

FOREIGN PATENT DOCUMENTS

DE    102017210541 A1 * 12/2018 .............. B60L 53/14
DE    102018116543 A1 *  1/2020 .............. B60L 53/14
(Continued)

OTHER PUBLICATIONS

Lin Chen, Shan Lin, and Hua Huang. 2016. Charge me if you can: charging path optimization and scheduling in mobile networks. In Proceedings of the 17th ACM International Symposium on Mobile Ad Hoc Networking and Computing (MobiHoc '16). Association for Computing Machinery, New York, NY, USA, 101-110. (Year: 2016).*

*Primary Examiner* — Elaine Gort
*Assistant Examiner* — Ellis B. Ramirez
(74) *Attorney, Agent, or Firm* — Fish & Richardson P.C.

(57) ABSTRACT

Systems and techniques are provided for charging devices at a property using battery-charging drones. In some implementations, a monitoring system is configured to monitor a property and includes a battery-powered sensor configured to generate sensor data. The system includes a drone that is configured to navigate the property and charge the battery-powered sensor. A monitor control unit is configured to obtain a battery level from the battery-powered sensor and compare the battery level to a battery level threshold. Based on the comparison, the monitor control unit determines that the battery level does not satisfy the threshold. Based on the determination, the monitor control unit generates and transmits an instruction to a drone for the drone to navigate to the battery-powered sensor and charge a battery of the battery-powered sensor. The monitor control unit receives data from
(Continued)

the drone that indicates whether the drone charged the battery of the sensor.

18 Claims, 6 Drawing Sheets

Related U.S. Application Data

(60) Provisional application No. 62/675,431, filed on May 23, 2018.

(51) Int. Cl.
| | | |
|---|---|---|
| *B60L 53/36* | (2019.01) | |
| *G05D 1/12* | (2006.01) | |
| *G05D 1/10* | (2006.01) | |
| *H02J 7/00* | (2006.01) | |
| *B64U 50/34* | (2023.01) | |
| *B64U 101/00* | (2023.01) | |

(52) U.S. Cl.
CPC .......... *G05D 1/12* (2013.01); *H02J 7/00714* (2020.01); *H02J 7/007182* (2020.01); *B64U 50/34* (2023.01); *B64U 2101/00* (2023.01); *H02J 7/0045* (2013.01)

(58) Field of Classification Search
CPC .......... B64C 2201/12; B64C 2201/128; G05D 1/101; G05D 1/12; G05D 1/104; H02J 7/0045; H02J 7/0047; H02J 7/00714; H02J 7/007182; Y02T 10/70; Y02T 10/7072; Y02T 90/12; Y02T 90/14
USPC .......................... 701/3; 705/7.12, 7.22, 7.25
See application file for complete search history.

(56) References Cited

U.S. PATENT DOCUMENTS

| | | |
|---|---|---|
| 9,492,922 B1 | 11/2016 | Johnson et al. |
| 9,630,517 B2 | 4/2017 | Lee et al. |
| 2015/0035437 A1 | 2/2015 | Panopoulos et al. |
| 2016/0216711 A1* | 7/2016 | Srivastava ........... G08G 5/0013 |
| 2016/0300496 A1* | 10/2016 | Cheatham, III ..... G08G 5/0013 |
| 2018/0231971 A1* | 8/2018 | Greenberger ........ G08G 5/0069 |
| 2019/0049274 A1 | 2/2019 | Browning et al. |
| 2019/0126769 A1* | 5/2019 | Schmalzried ........... B60L 53/65 |
| 2020/0130510 A1* | 4/2020 | Eck .................... G06Q 10/0836 |
| 2020/0269977 A1* | 8/2020 | Noble .................. B64C 39/024 |

FOREIGN PATENT DOCUMENTS

| | | |
|---|---|---|
| WO | WO2013055265 | 4/2013 |
| WO | WO2016113766 | 7/2016 |
| WO | WO2016170085 | 10/2016 |

\* cited by examiner

500

```
┌─────────────────────────────────────────────────┐
│   OBTAIN BATTERY INFORMATION FROM A DEVICE      │
│                                          502    │
└─────────────────────────────────────────────────┘
                        │
                        ▼
┌─────────────────────────────────────────────────┐
│   DETERMINE A BATTERY LEVEL FOR THE DEVICE      │
│                                          504    │
└─────────────────────────────────────────────────┘
                        │
                        ▼
┌─────────────────────────────────────────────────┐
│ DETERMINE THAT THE BATTERY LEVEL IS BELOW A     │
│           BATTERY LEVEL THRESHOLD               │
│                                          506    │
└─────────────────────────────────────────────────┘
                        │
                        ▼
┌─────────────────────────────────────────────────┐
│ IN RESPONSE TO DETERMINING THAT THE BATTERY     │
│ LEVEL IS BELOW THE BATTERY LEVEL THRESHOLD,     │
│ GENERATE INSTRUCTIONS FOR A DRONE TO NAVIGATE   │
│ TO THE DEVICE AND TO CHARGE THE BATTERY OF      │
│ THE DEVICE                                      │
│                                          508    │
└─────────────────────────────────────────────────┘
                        │
                        ▼
┌─────────────────────────────────────────────────┐
│   TRANSMIT THE GENERATED INSTRUCTIONS TO        │
│               THE DRONE                         │
│                                          510    │
└─────────────────────────────────────────────────┘
                        │
                        ▼
┌─────────────────────────────────────────────────┐
│ RECEIVE AN INDICATION THAT THE DRONE CHARGED    │
│         THE BATTERY OF THE DEVICE               │
│                                          512    │
└─────────────────────────────────────────────────┘
```

FIG. 5

BATTERY DRONE

CROSS-REFERENCE TO RELATED APPLICATIONS

This application is a continuation of U.S. application Ser. No. 16/420,531, filed May 23, 2019, now allowed, which claims the benefit of U.S. Provisional Application No. 62/675,431 filed May 23, 2018. The complete disclosures of all of the above patent applications are hereby incorporated by reference in their entirety for all purposes.

TECHNICAL FIELD

This specification relates generally to battery powered drones.

BACKGROUND

A drone is an aircraft without a human pilot on board. The drone can fly with various degrees of autonomy, for example, under remote control by a human operator or autonomously by onboard computers. A drone can be programmed with various tasks and fly from a starting position to an ending position.

SUMMARY

The subject matter of the present disclosure is related to techniques for charging devices at a monitored property using battery-charging drones. The techniques may use battery levels of the devices to determine when to use the battery-charging drones to charge the devices. In addition, the techniques compare the battery levels of the devices to battery level thresholds to determine when to transmit a request for a battery-charging drone to a remote drone server. In response to receiving the request for the battery-charging drone, the remote drone server transmits launching information to a drone to fly to charge the device. In particular, the remote drone server determines which drone to provide launching information to be analyzing a drone launching order. The drone launching order can be based on which of the one or more drones powers first, a need for a type of drone, a drone that includes a sufficient amount of charge to power the device, and historical usages for each of the drones. The launching information includes information pertaining to the monitored property where the device to be charged is located, GPS coordinate information for flying to the device, and the type of device that requires charging. The benefit of using battery-charging drones to charge devices in a monitored property removes the burden of remembering to charge batteries for each of the devices from the user and the user can spend time more efficiently on other tasks.

In one general aspect, a method is performed by one or more computers of a monitoring system. The method includes receiving, by a monitoring system that is configured to monitor a property and from a first battery-powered sensor that is located at the property and that is configured to generate first sensor data that reflects a first attribute of the property, the first sensor data; obtaining, from the first battery-powered sensor, indicating a first battery level of the first battery-powered sensor; comparing the first battery level of the first battery-powered sensor to a battery level threshold; based on comparing the first battery level of the first battery-powered sensor to a battery level threshold, determining that the first battery level of the first battery-powered sensor does not satisfy the battery level threshold; based on determining that the first battery level of the first battery-powered sensor does not satisfy the battery level threshold, generating an instruction for a first drone to navigate to the first battery-powered sensor and charge a battery of the first battery-powered sensor, wherein the first drone is configured to navigate the property and charge the first battery-powered sensor and other battery-powered sensors; transmitting, to the first drone, the instruction to navigate to the first battery-powered sensor and charge the battery of the first battery-powered sensor; and receiving, from the first drone, data indicating whether the first drone charged the battery of the first battery-powered sensor.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, in some implementations, the method includes obtaining, from the first battery-powered sensor, data indicating first battery information that indicates a type of battery in the first battery-powered sensor and a first timestamp that indicates a first time that the first battery-powered sensor determined the first battery level; and obtaining, from a second battery-powered sensor, data indicating a second battery level the second battery-powered sensor, a type of battery in the second battery-powered sensor and a second timestamp that indicates a time that the second battery-powered sensor determined the second battery level, wherein generating the instruction to navigate to the first battery-powered sensor and charge the battery of the first battery-powered sensor is based on the first battery information and the second battery information, wherein the second battery-powered sensor is located at the property and is configured to generate the second sensor data that reflects a second attribute of the property.

In some implementations, the method further includes generating the instruction to navigate to the first battery-powered sensor charge the battery of the first battery-powered sensor by generating the instruction to navigate to the first battery-powered sensor and charge the battery of the first battery-powered sensor and then to navigate to the second battery-powered sensor and charge a battery of the second battery-powered sensor based on the first battery information and the second battery information.

In some implementations, the method includes obtaining, from a third battery-powered sensor, data indicating a third battery level the third battery-powered sensor, a type of battery in the third battery-powered sensor and a third timestamp that indicates a time that the third battery-powered sensor determined the third battery level, wherein the third battery-powered sensor is located at the property and is configured to generate third sensor data that reflects a third attribute of the property; and generating the instruction to navigate to the first battery-powered sensor charge the battery of the first battery-powered sensor by generating the instruction to navigate to the first battery-powered sensor and charge the battery of the first battery-powered sensor and bypass navigating to the third battery-powered sensor and charge the battery of the third battery-powered sensor based on the first battery information and the third battery information.

In some implementations, the method includes receiving data indicating historical usage patterns of the first battery-powered sensor; based on the historical usage patterns and the first battery level of the first battery-powered sensor, determining an expected battery life of the battery of the first-battery powered sensor; and determining the battery level threshold based on the expected battery life of the battery of the first-battery powered sensor.

In some implementations, the first drone includes: a connector that is configured to connect to a receptacle of the first battery-powered sensor and provide power to the battery of the first battery-powered sensor.

In some implementations, the method includes generating, from a battery-powered sensor that is located at the property, sensor data that reflects an attribute of the property, and that includes a battery slot; navigating, by a battery drone, the property; and attaching, by the battery drone, to the battery slot to deliver power to the battery-powered sensor.

In some implementations, the method includes generating the instruction for the first drone to navigate to the battery-powered sensor by determining a route for the first drone to navigate from a charging station to a location of the battery-powered sensor and back to the charging station.

In some implementations, the method includes determining the route for the first drone to navigate by: determining that a second battery-powered sensor is located along the route, wherein the second battery-powered sensor is located at the property and is configured to generate second sensor data that reflects a second attribute of the property; and determining that a battery of the first drone stores power that is greater than a first amount of power to fully charge the battery of the first battery-powered sensor plus a second amount of power to navigate the route; based on determining that the second battery-powered sensor is located along the route and that the battery of the first drone stores power that is greater than the first amount of power plus the second amount of power, including the second battery-powered sensor in the route.

In some implementations, wherein: a second battery level of the second battery-powered sensor satisfies the battery level threshold, and the instruction includes fully charging the battery of the first-battery powered sensor and charging the battery of the second-battery powered sensor based on an amount of power required by the first drone to navigate the route.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is a flowchart of an example process for charging a battery at a monitored facility using a drone.

DETAILED DESCRIPTION

Figure 1:
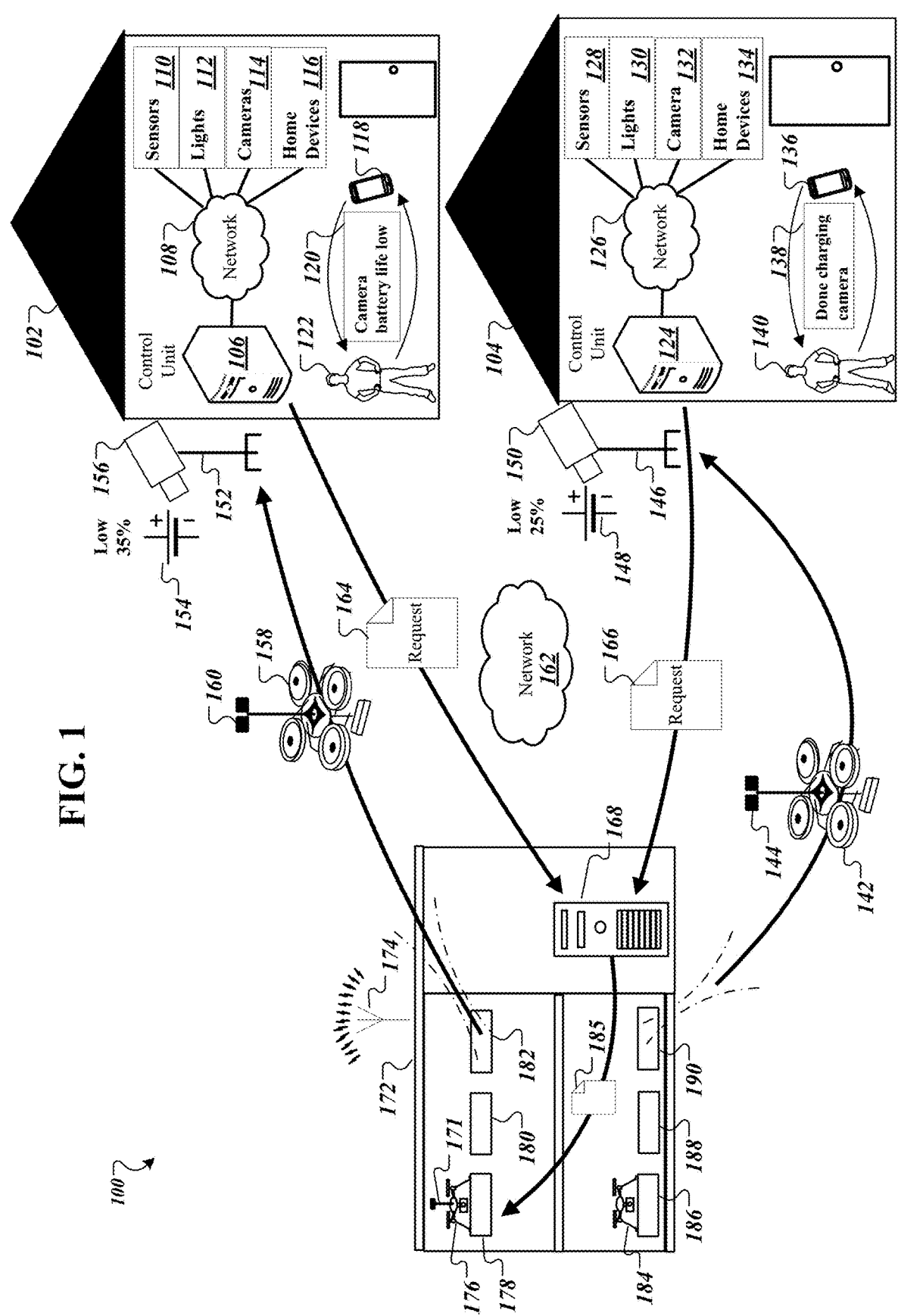
FIG. 1 is a contextual diagram of an example system for charging a battery-charging device at a monitored facility using a drone.

FIG. 1 is a contextual diagram of an example system 100 for charging a battery-charging device at a monitored facility using a drone. Though system 100 is shown and described including a particular set of components in a monitored property 102 includes a control unit server 106, network 108, sensors 110, lights 112, cameras 114, home devices 116, drone 142, drone 158, network 162, remote server 168, and drone-docking system 172, the present disclosure need not be so limited. For instance, in some implementations, only a subset of the aforementioned components may be used by the system 100 for charging a battery-charging device at each monitored property. As an example, there may be a system 100 that does not use lights 112. Similarly, there may be implementations that the control unit, such as control unit server 106, is stored in the remote server 168. There may be implementations that the remote server 168 is stored in the control unit server 106. Yet other alternative systems also fall within the scope of the present disclosure such as a system 100 that does not use a control unit server 106. Rather, these systems would communicate directly with the remote server 168 to perform the monitoring. Additionally, the monitored property 104 may also include only a particular set of components, similar to the monitored property 102. For these reasons, the system 100 should not be viewed as limiting the present disclosure to any particular set of necessary components.

As shown in FIG. 1, monitored property 102 includes a control unit 106 that utilizes various components to monitor the monitored property 102. The various components within the monitored property 102 may include one or more sensors 110, one or more lights 112, one or more cameras 114, and one or more home devices 116. The one or more cameras 114 may include video cameras that are located at the exterior of the monitored property 102, as well as located at the interior of the monitored property 102. For instance, a video camera 156 may be located at the exterior of the monitored property 102 facing the backside of the monitored property 102. In another example, a video camera 150 may be located on a front gate and at the exterior of the monitored property 104. In another example, the video camera 156 may be located at the interior of the monitored property 102 near the front door.

In some implementations, the devices located in the monitored property 102 may include one or more rechargeable batteries. For example, camera 156 includes rechargeable battery 154 and camera 150 includes rechargeable battery 148. In particular, the devices with the rechargeable batteries may allow a property owner, such as property owner 122, to place these devices and use these devices anywhere on the monitored property 102. For example, property owner 122 can take pictures and record video footage using portable camera 156 in the monitored property 102. In other examples, the devices utilizing rechargeable batteries can include decorative lamps, remote controls, ceiling fans, and laptops. The property owner 122 can place these rechargeable battery powered devices in hard to reach locations. For example, the property owner 122 can place the camera 156 located high above the living room in a corner of the ceiling. In another example, the camera 156 may be anchored at the top of a tree in its trunk out of normal human reach and strong enough to not fall.

The rechargeable batteries power each of these devices until the batteries charge is depleted. After the batteries charge has depleted, the batteries need to be recharged. In order for the batteries to be recharged for the devices that exist in hard to reach locations, these devices can be connected to a receptacle. For example, camera 156 includes receptacle 152 and camera 150 includes receptacle 146. The receptacle includes one or more adapters and an extendable cable connecting the device and the one or more adapters. In some implementations, the receptacle's adapter may include a female plug component. In other implementations, the receptacle's adapter may include a male plug component. In other implementations, the receptacle's adapter may include both a male plug component and a female plug component. In some implementations, the device's receptacle may connect to an outlet to power its rechargeable batteries. In other implementations, the device's receptacle may connect to an opposing receptacle for powering the rechargeable batteries. For example, if the device's receptacle includes one or more male adapters, then the opposing receptacle includes one or more female adapters. In an alternative example, the opposite is also true, if the device's receptacle includes one or more female adapters, then the opposing receptacle includes one or more male adapters.

The receptacle's extendable cable may extend over a range of distances. For example, the cable may extend between one feet to 10 feet. By having an extendable cable connected between the device and its receptacle, the device can be placed in difficult to reach places and still have its batteries recharged. This benefit allows the device to remain in the difficult locations without the property owner 122 having to manually remove the device to recharge its batteries. This allows the device to be automatically recharged without the user having to perform any additional steps.

The one or more sensors 110 may include a motion sensor located at the exterior of the monitored property 102, a front door sensor that is a contact sensor positioned at the front door, and a lock sensor that is positioned at the front door and each window, to name a few examples. The contact sensor may sense whether the front door, the garage door, or the window is in an open position or a closed position. The lock sensor may sense whether the front door and each window is in an unlocked position or a locked position. The one or more home devices 116 may include home appliances such as a washing machine, a dryer, a dishwasher, an oven, a stove, a microwave, and a laptop, to name a few examples. The monitored property 102 may also include a security panel that may receive one or more messages from a corresponding control unit server 106 and a remote server 168. The monitored property 104 includes similar components and functions similarly to the monitored property 102.

The control unit server 106 communicates over a short-range wired or wireless connection over network 108 with connected devices such as each of the one or more sensors 110, one or more lights 112, one or more cameras 114, one or more home devices 116 (washing machine, a dryer, a dishwasher, an oven, a stove, a microwave, a laptop, etc.), drones (142, 158, 176, and 184), and remote server 168 to receive sensor data descriptive of events detected by the one or more sensors 110, the one or more lights 112, the one or more cameras 114, the drones (142, 158, 176, and 184), and the remote server 168 in the monitored property 102. Control unit server 124 similarly communicates to its corresponding connected devices in monitored property 104 along with devices located at the drone-docking system 172.

In some implementations, each of the connected devices may connect via Wi-Fi, Bluetooth, or any other protocol used to communicate over network 108 to the control unit server 106. Additionally, the control unit server 106 communicates over a long-range wired or wireless connection with a remote server 168 over network 162 using one or more communication links. The control unit server 124 also communicates with remote server 168 over the network 162 using the one or more communication links.

In some implementations, the remote server 168 is located remote from each monitored properties 102 and 104, and manages communicating with the monitored properties 102 and 104, as well as other (and, perhaps, many more) monitoring properties located at different locations that are owned by different property owners. In some implementations, the remote server 168 communicates bi-directionally with the control unit server 106 (and control unit server 124). Specifically, the remote server 168 receives notifications from each control unit and transmits instructions to each control unit server 106 and 124 for particular events.

In some implementations, the drone-docking system 172 includes one or more docking stations, one or more drones, and a remote server 168. In particular, the drone-docking system 172 include drone-docking stations 178, 180, 182, 186, 188, and 190. The drone-docking system 172 may include a different number of drone-docking stations; the drone-docking stations 178, 180, 182, 186, 188, and 190 are shown for illustrative purposes only. The drone-docking system 172 may include drones 176, 158, 184, and 142. The drone-docking system 172 may include a different number of drones; the drones 176, 158, 184, and 142 are shown for illustrative purposes only.

In some implementations, a drone can include a propulsion motor for the propellers, propellers, a processing unit, one or more cameras, one or more lights, and one or more chargeable batteries. The drone's processing unit can include a transmitter, a receiver, a processor, memory, a GPS device, and a power unit to power the drone. The drone's processing unit performs the drone's decision-making processes on requests that come from the remote server 168 and a control unit from each of the monitored properties. The drone can range in sizes small enough to fit in a slot for a D cell battery, for example, or large enough to hold one or more property owners.

In some implementations, the drones dock with the docking stations for charging. For example, drone 176 docks with docking station 178, drone 158 docks with docking station 182, drone 184 docks with docking station 186, and drone 142 docks with docking station 190. In some implementations, a drone docks with a first open docking station. In other implementations, a drone docks with a predetermined docking station. In other implementations, the remote server 168 instructs a drone to dock with a particular docking station in the drone-docking system 172.

In some implementations, each drone docks with a docking station to charge the batteries of the drone. In particular, each drone docks with the docking station by creating a connection between a platform of the docking station and a charging connector of the drone. Alternatively, each drone docks with the docking station by setting atop the platform of the docking station. As such, drone 176 docks with docking station 178 to charge the batteries of drone 176 to a full charge using various methods. In one method, the docking station can charge the drone's batteries using inductive charging. In another method, the docking station can charge the drone's batteries using a DC power supply. In another method, the docking station can charge the drone's batteries using sources that provide a constant current supply and vary the voltage. Once the drone 176's batteries have been fully charged, the docking station 178 stops charging drone 176.

In some implementations, each drone includes a connector for powering the rechargeable batteries of the device found on the monitored property. In particular, the connector includes one or more adapters connected to the drone. For example, drone 176 shown in the drone-docking system 172 includes a connector 171. The connector 171 includes an extended portion and one or more adapters at the end of the extended portion. The one or more adapters can include one or more male plug components, one or more female plug components, or both male and female plug components. The drone's connector connects to the receptacle component of a device to charge the device. For example, drone 158 includes a connector 160 for powering a device. Drone 158 connects its connector 160 to receptacle 152 of outdoor camera 156 for charging battery 154. The drone 158 includes one or more batteries to charge the battery 154 of the device. In some implementations, when drone 158 finishes charging the device, drone 158 returns back to docking station 182 at the drone-docking system 172.

In some implementations, a drone can fit in a slot of a rechargeable battery of the device. As such, the drone itself can be the rechargeable battery of the device. This requires the drone's motor for the propeller to be small enough to fit in the rechargeable battery slot. In some implementations, the drone can guide itself to connect to the charging slot of the device. Upon connecting to the charging slot of the device, the drone powers down its propulsion motor and the device draws charge from the drone's battery to power the device batteries of the drone power the device. For example, camera 150 powers on to record video footage after the drone connects to the charging slot of the camera 150.

In some implementations, when the drone determines its battery level is below a threshold level, the drone detaches from the device and flies to the docking station system 172 for charging. For example, drone 184 returned to the docking station system 172 for charging after its battery level had dropped below a 25% battery threshold level. In this example, remote server 168 instructed drone 184 to return to docking station 186 for charging.

In some implementations, remote server 168 communicates with the docking stations, the drones, and the control unit server with antenna 174 over network 162. In one instance, the remote server 168 transmits a notification to a control unit server when a drone departs the drone-docking system 172 for a device at the monitored property to the corresponding control unit server. The notification prepares the control unit server to receive status notification from the inbound drone. For example, the remote server 168 transmits a notification that includes an identification of the drone 142, address information of the drone 142, the device the drone 142 has been instructed to charge, and a level of the battery power in the drone 142.

In other implementations, remote server 168 can receive notifications from the drones. The notifications can indicate to the remote server 168 the identification of the drone, address information of the drone, the docking station the drone is returning to for charging, the level of the battery power of the drone, and other drone status information.

In the example shown in FIG. 1, property owner 122 may own the monitored property 102 and can arm the monitored property 102 at any point in time with a signature profile. In doing so, the property owner 102 may set a profile to allow the one or more drones found in the drone-docking system 172 to charge a battery of any device that requires charging in a monitored property automatically without the use of manual intervention. In particular, this profile allows the remote server 168 to determine whether to connect a drone the size of a battery to the device for charging or connect a drone that includes a connector, such as connector 160, to power the device. The property owner 122 may interact with client device 118 to activate a signature profile, such as "automatic charging" for the monitored property 102. Alternatively, the property owner 122 may set another signature profile, such as "requested charging," for when a property owner 122 requests for a specific device to be charged.

In some implementations, the client device 118 may display a web interface, an application, or a device specific application for a smart home system. The client device 118 can be, for example, a desktop computer, a laptop computer, a tablet computer, a wearable computer, a cellular phone, a smart phone, a music player, an e-book reader, a navigation system, a security panel, or any other appropriate computing device. In some implementations, the client device 118 may communicate with the control unit server 106 over the network 108. The network 108 may be wired or wireless or a combination of both and can include the Internet.

In some implementations, property owner 122 may communicate with the client device 118 to activate a signature profile for the monitored property 102. To illustrate, property owner 122 may first instruct the control unit server 106 to set a signature profile associated with arming the monitored property 102. For example, property owner 122 may use a voice command to say "Smart Home, automatic charging," to the client device 118. The voice command may include a phrase, such as "Smart Home" to trigger the client device 118 to actively listen to a command following the phrase. Additionally, the phrase "Smart Home" may be a predefined user configured term to communicate with the client device 118. The client device 118 can send the voice command to the control unit server 106 over the network 108.

In some implementations, the control unit server 106 may notify the remote server 168 that the monitored property 102 is set to execute the automatic charging signature profile. In addition, the control unit 106 may set associated parameters in response to receiving the voice command. Moreover, the control unit 106 can send back a confirmation to the client device 118 in response to arming the monitored property 102 and setting the associated parameters. For example, the control unit server 106 may transmit a response to the client device 118 that reads "Smart Home signature profile set."

In some implementations, in order for the control unit server 106 to allow property owner 122 and others to set and activate a signature profile case for the monitored property 102, the property owner 122 and others may define and store signature profiles in the control unit server 106. In other implementations, the property owner 122 and others may define and store signature profiles in the remote server 168 by instructing client device 118 to store at the remote server 168. The signature profile may be associated with each property owner and allow for various use cases of the devices in the monitored property. Each of the signature profiles can be associated with one user, such as property owner 122 or property owner 140. For example, a property owner 122 may create a signature profile for setting the automatic charging profile for the residential facility 102. In another example, a property owner 122 may create a signature profile for monitoring the monitored property 102 with drones 142, 158, 176, and 184 for monitoring the monitored properties 102 and 104.

In some implementations, property owner 122 may store one or more parameters associated with a use case in his or her signature profile. Specifically, the one or more parameters for each use case may describe a sensitivity amount for each of the sensors 110, an aperture amount for the cameras 114, a brightness intensity level of the lights 112, turning on or off selected home devices 116 such as television, laptop, one or more fans, setting a specific temperature of a thermometer, opening or closing the shades of a window a particular amount, alarm settings corresponding to the monitored property 102, defining a battery limit threshold for each device when the control unit server 106 should notify the remote server 168 for a drone to charge the corresponding device, and any other parameters to describe the use case. For example, property 122 may create a signature profile with a use case scenario for "automatic charging." The property owner 122 may define a sensitivity of 5× the amount for the one or more sensors 110, an aperture of f/8 for the one or more cameras 114, zero lumens for the one or more lights 112, turning on a television, turning on a laptop, turning on fans, setting the thermometer to 69 degrees Fahrenheit, opening the blinds of the one or more windows, turning on the outdoor camera 156, extending the extendable cable to 4 feet, setting a battery limit threshold to 25%, and turning on notifications for the smart home application on client device 118 indicating when the devices require battery recharging.

In some implementations, the control unit server 106 sets the parameters for the desired signature profile when the property owner 122 speaks "Smart home, set automatic charging" to the client device 118. The control unit server 106 saves the parameters in memory defined by the property owner 120 in the smart home application on the client device 118 in response to the user setting the parameters. In addition, the control unit server 106 may transmit the stored parameters for the signature profile to the remote server 168 to save for backup purposes. When the property owner 122 speaks "Smart home, set automatic charging," the client device 118 transmits an indication to the control unit server 106 to initiate the automatic charging profile. In response to receiving the indication from the client device 118, the control unit server 106 transmits the stored parameters corresponding to the automatic charging profile to each of the devices. In addition, the control unit server 106 transmits an indication to the remote server 168 to initiate the automatic charging profile settings at the drone-docking system 172.

In some implementations, the remote server 168 executes the received signature profile by powering on each of the drones and corresponding drone-docking stations. In other implementations, the control unit server 106 executes the received signature profile and instructs the remote server 168 to power the drones and corresponding drone-docking stations. In particular, the remote server 168 transmits a notification for powering on each of the drones and corresponding drone-docking stations over the antenna 174. In addition, the remote server 168 determines an order for launching the one or more drones to charge each of the devices at the monitored properties that include rechargeable batteries. In particular, the remote server 168 determines the launching order based on which of the one or more drones charges first, a need for a type of drone, and historical usages for each of the drones. For example, the remote server 168 sets drone 158 as the first drone to launch to charge a device because the drone-docking system 172 charged the batteries of drone 158 before any of the other drones. In another example, the remote server 168 determines drone 184 is the first drone to be launched for a device that requires the drone to be the rechargeable battery. Consequently, drones 176, 142, and 184 can only be used to connect to the receptacles, such as receptacle 152 and receptacle 146, and therefore, and cannot be used as the rechargeable battery itself. In another example, the remote server 168 determines a launching order of drone 142, drone 160, and drone 171 because, in the past, the remote server 168 determined that drone 142 charges devices faster than drone 160 and drone 160 typically charges devices faster than drone 171. In other implementations, the control unit server 106 determines the launching order of the drones in the drone-docking system 172. The control unit server 106 can similarly act as the remote server 168 and communicate with the drones and corresponding drone devices in the drone-docking system 172 over the network 162.

In some implementations, the remote server 168 may determine the launching order using a historical analysis, a machine learning analysis, or a predetermined order set order by a property owner. For instance, property owner 122 may determine that the launching order should be drone 184, drone 176, drone 142, and drone 158, respectively. In some implementations, the property owner 122's set launching order takes precedence over the remote server 168's launching order. In some implementations, the control server 106 can determine the drone launching order.

The drone launching order can be based on an expected battery life of each of the devices. Battery life is typically a non-linear degradation and because a low-battery alert typically issues to the control unit server 106 at the end of the batteries life, a finely tuned algorithm can be used to monitor each device's battery life. The control unit server 106 can execute the algorithm to monitor each device's battery life. In addition, the control unit server 106 can fine-tune the battery life algorithm to in order to adapt for a change in typical device battery life. The control unit server 106 can obtain historical usage patterns for each of the devices found in the monitored property 102. For example, the control unit server 106 may retrieve from a database how long the batteries for each of the devices in the property 102 can last on typical use before they require recharging. This data may be stored at the remote server 168. Using the historical usage patterns for each of the devices, the control unit server 106 can determine an expected battery life for the batteries in each of the devices in the property 102. The control unit server 106 can generate a battery-level threshold using the expected battery life for the batteries in each of the devices. For example, the control unit server 106 can average each of the values of the expected battery life to determine the battery-level threshold. In another example, the control unit server 106 can set the battery level threshold to the highest, the lowest, or the medium value from an expected battery life for each of the devices.

In some implementations, the control unit server 106 starts the battery life algorithm by analyzing a history of each device's battery life cycle. The control unit server 106 can compile a list of devices and retrieve their battery life cycle. For example, the control unit server 106 may have an outdoor camera, a thermometer, and an electric grill outside the monitored property 102. The control unit server 106 can search the INTERNET, the remote server 168, or a database within the monitored property 102 for a history of the battery life cycle for the outdoor camera, the thermometer, and the electric grill. The battery life cycle can include a periodicity starting from 0% battery life to fully charged battery life at 100% and fully depleting the battery life to 0% with typical normal use of the device. For example, the battery change cycle life can be a period of 1 month for the outdoor camera. The outdoor camera may require four hours to fully charge the battery from 0% to 100% and near 1 month to deplete the battery from 100% to 0% on typical use. The other devices in the monitored property 102 may have different battery life cycles. In some implementations, each device's battery life cycle decreases over time. In some implementations, the control unit server 106 can store previous a battery life cycle for each of the devices.

The control unit server 106 may not find a battery life cycle for one of the devices, and if so, the control unit server 106 searches the INTERNET or some other central database for this information. For example, the control unit server 106 may not find a battery life cycle for newly implemented devices at the monitored property 102. In particular, the control unit server 106 may search for the battery life cycle for all of the devices and similar models of the devices. The control unit server 106 can aggregate the recharge periodicity and any out of power events to generate an average battery life cycle for each of the devices. In some implementations, the control unit server 106 generates the average battery life cycle using other external conditions. The control unit server 106 analyzes a location of the device, device usage patterns, and weather patterns to determine the average. For example, if the monitored property 102 is located in a humid area, such as Miami, Fla., the generated average battery life cycle for the outdoor camera's battery may be decreased because high humidity negatively affects the battery life of a device. The recharge periodicity is similar to battery life cycle, in that this indicates the amount of time it takes for the device's battery to recharge and the amount of time it takes for the device's battery to deplete after normal use from fully charged to zero charge. Next, the control unit server 106 compares the recharge periodicity of each device to the last time a device's battery has been recharged. For example, if the outdoor camera has a recharge periodicity of 1 month and the control unit server 106 determines the last recharge period of the outdoor camera took place 15 days ago, the control unit server 106 can determine that the outdoor camera should be recharged within 15 days from today.

The control unit server 106 may find battery life cycle from previous use of the device battery. For example, the control unit server 106 may find a battery life cycle for devices that have been previously implemented at the monitored property 102. In particular, the control unit server 106 may transition towards a history-based battery charge cycle based on the requirement of the device's battery. For example, the history-based battery charge cycle would be implemented on a sliding scale. As the device ages and is used more frequently, the control unit server 106 focuses more efforts monitoring the device, thus sliding the scale to monitor the device because of the relevance of the device's battery life. The device's battery life cycle history would be more relevant since battery degradation is non-linear and battery life worsens as time increases. Thus, the control unit server 106 needs to more closely monitor the battery level of the older device.

In some implementations, the control unit server 106 applies attributes to each of the devices being monitored in each of the monitored properties. The attributes can include, geolocation information of the device, device (type and model) usage patterns, and other extemporaneous factors. The control unit server 106 monitors each of these attributes and feeds these attributes to the algorithm in order to produce a more fine-tuned battery life cycle. For example, the control unit server 106 may feed the attribute that the device is being used at a 90% rate per day, rather than the 75% rate per day. This may decrease the battery life cycle of the particular device. The same situations can be applied to other devices at the various monitored properties. Additionally, when the remote server 168 instructs a drone to recharge the device, the remaining power in the device at the time of recharge can also be used to tune the behavior of the algorithm. For example, the control unit server 106 may determine from the outdoor camera's battery life cycle that it is time to recharge the outdoor camera's battery. The control unit server 106 can transmit an indication to the remote server 168 to request for a drone, such as drone 176, to recharge the outdoor camera. Drone 176 may fly to the outdoor camera to charge its battery and determine that the battery life is at 45%, for example. The drone 176 can report the remaining battery life of the outdoor camera to the control unit server 106. The control unit server 106 can add the 45% battery life remaining to the algorithm such as to increase the battery life cycle of the outdoor camera due to the control unit server 106's determination of an incorrect battery life cycle for the outdoor camera. The control unit server 106 can repeat this process for each of the devices in a monitored property.

The remote server 168 can then create two device charging lists based on the algorithm (and corresponding factors) of the battery life cycle. The first device-charging list can be based on devices that must be serviced for charging and/or powering during a time period that one or more drones are active. The second device-charging list can be a prioritized list of devices that require servicing during the time period that one or more drones are active. The remote server 168 can generate the second device-charging list using the algorithm and battery information of the particular device. For example, the remote server 168 can analyze the battery information that includes a type of battery for the device, a current battery level of the device, and a timestamp corresponding to when the battery information was last obtained from the particular device. Using the results of the algorithm and the battery information, the remote server 168 can prioritize devices that require charging. For example, the remote server 168 places some devices on the second device-charging list higher than other device. The higher ranked device may require immediate charging because they have a low battery level and the timestamp corresponding to when the battery information was last obtained occurred outside a threshold of time. Alternatively, the remote server 168 may place some devices lower on the second device-charging list lower than other devices. The remote server 168 may delay the charging of the lower ranked devices when those devices have a high enough charge and the timestamp corresponding to when the battery information was last obtained occurred within a threshold of time.

In some implementations, the remote server 168 analyzes the first device-charging list to service all devices. The first device-charging list includes a route to service each of the devices. The control unit 106 determines an optimal route to each of the devices on the first charging list. Additionally, the control unit server 106 determines an optimal route from each of the devices back to the drone docking station 172. The optimal route includes the shortest distance between each of the devices for a drone to traverse. The control unit server 106 can then add any new device that requires charging on a sliding scale to the first device-charging list based on a distance between the drones current position on the optimal route to the location of the new device. For example, if the new device is determined to be $3^{rd}$ closest to the drone on the first device-charging list, with device A and device B on the first device-charging list being closer to the drone, the new device would be placed on the first charging list after the positions of device A and device B. Alternatively, in this example, if the new device is determined to be closer to the drone on the first device-charging list as compared to device A and device B, then the control unit server 106 inserts the new device ahead of the positions of devices A and B. The control unit server 106 can also generate a route for a drone to fly from each of the devices back to the drone docking station 172. The control unit server 106 can transmit the route and notification to each of the drones at the drone docking station 172 and to the remote server 168. In the case that a drone's battery is below a battery-level threshold during its flight, the drone will use the return route to fly back to the drone docking station 172 for recharging.

In some cases, the control unit server 106 can transmit a notification to drone 176 for charging each of the devices in the first device-charging list that require service, i.e., require charging. The notification can include an indication to fully charge a first device, such as an outdoor camera, and a second device, such as another outdoor camera. Additionally, the notification can include an optimal route to the first device and the optimal route from the first device to the second device. The notification can also include an optimal route from the first device back to the drone charging station 172 and another optimal route from the second device back to the drone charging station 172. The control unit server 106 instructs the drone 176 to charge the first device and the second device based on an amount of power required by the drone 176 to navigate the optimal route to the first device, the second device, and back to the drone docking station 172.

In addition, the control unit server 106 can create a duty roster for devices that require charging based on the first device-charging list and as many devices on the second device-charging list that can be serviced in the given timeframe. The duty roster can include a list of devices that need charging services based on determining a priority of the device to be charged, an optimal route to each of the devices that services the highest priority devices and utilizes each of the drones to travel to the devices based on a shortest distance between points. In particular, the battery data of each of the devices can be utilized to determine the duty roster for the drones for the next charging cycle.

In some implementations, the remote server 168 and control unit server 106 can leverage the algorithm to proactively arrange drones for recharging and prevent communication failure. In particular, by leveraging the algorithm to proactive arrange drones for recharging, the control unit server 106 can calculate when the next predicted battery replacement date occurs and relay this information to the remote server 168. In response, the remote server 168 can plan accordingly by knowing in advance how many drones need to be deployed. The remote server 168 can deploy the drones to the monitored property 102, and determine the most efficient route to deploy the drones to charge the devices at the monitored property 102.

In some cases, the communications between the remote server 168 and the control unit server 106 may fail. As such, any request from the control unit server 106 to charge a particular device, such as request 164, will not be received by the remote server 168. In response, the predicted battery replacement dates as determined by the remote server 168 will be used to send out the drones to the monitored property 102. In some cases, the property owner 122 may receive an indication on his/her client device 120 that the remote server 168 did not receive the control unit 106's request. However, the property owner 122 will also receive a notification from the remote server 168 that the drones are automatically scheduled to fly to the monitored property 102 to charge the battery of the devices based on the predicated battery replacement dates. The remote server 168 takes control of the drone schedule based on predicated battery replacement dates calculated and when communication between remote server 168 and control unit server 106 fails. In addition, the control unit server 106 may detect this failure and may not know that the remote server 168 will send over a drone to the monitored property 102.

In some implementations, the remote server 168 may send a response to the control unit server 106 that the automatic charging signature profile's parameters are set. In particular, the notification indicates to the control unit server 106 that the launching order is set and the drones along with corresponding docking stations are powered on.

In some implementations, the remote server 168 may also transmit a notification to the other control unit servers corresponding to monitored properties indicating that the docking station system 172 is set to power any devices with rechargeable batteries. In some implementations, a drone-docking system 172 may power devices corresponding to only one monitored property. In other implementations, a drone-docking system 172 may service and power devices corresponding to multiple monitored properties in a particular area. For instance, the particular area can be a street, a neighborhood, or a cul-de-sac, to name a few examples.

In response to the control unit server 106 receiving the response that the automatic charging signature profile parameters are set, the control unit server 106 transmits a notification to the client device 118 that displays "Smart Home, automatic charging profile set" once the control unit server 106 sets the parameters. In addition, the control unit server 106 may also transmit the same response to a security panel located on a wall at the monitored property 102.

In some implementations, the control unit server 106 monitors the status of the sensors 110, the status of the lights 112, the status of the cameras 114, and the status of the home devices 116. In particular, the control unit server 106 may transmit a request to each of these devices for a corresponding battery life. The control unit server 106 may transmit the request to each of these devices on a periodic basis, for example, hourly, daily, weekly. In other implementations, the control unit server 106 may instruct each of the devices to transmit a corresponding battery life status when the corresponding battery life is within proximity of a battery level threshold. For example, the battery level threshold may be set to 25%. In some implementations, the property owner 122 can set the battery level threshold using the smart home application on the client device 118. The control unit server 106 may instruct each device to transmit the corresponding battery life when the corresponding battery life is within 3% of the corresponding battery life. In other implementations, the control unit sever 106 may monitor an expected lifecycle of a battery in each device. The expected lifecycle of the battery in each device can be a time-period that a battery life in each device is expected to last. For example, the expected lifecycle of the battery in each device can be in terms of hours, days, and months. At the end of each expected lifecycle of the battery, the control unit server 106 transmits a request to the remote server 168 to charge the battery in the device. In some implementations, some devices may not have the ability to detect and report battery usage. For these devices, the control unit server 106 can monitor the typical lifespan of the battery in the device as to when to charge the battery. For example, the control unit server 106 can provide an indication to the remote server 168 when the devices exceed 75% of its expected lifecycle. In other implementations, the devices that do not have the ability to detect and report battery usage, the backend system can detect that a battery recharging is complete. For example, the control unit server 106 or the remote server 168 may be able to detect the fact that the battery of the device has been recharged either by a property owner 122 or another drone 176. The algorithm for predicting the battery life cycle of the device may use this data (e.g., when the drone 176 or the property owner 122 recharged the battery) to fine tune the algorithm for these particular devices.

In some implementations, the control unit server 106 receives a battery life information from a device. The battery life information includes a device type, a device model, the type of battery, the battery life, and a timestamp corresponding to the transmitted battery life. For example, the control unit server 106 can receive battery life information from camera device 156 that indicates the device type as a camera, the device model is "Security Company Smart Camera 520," the type of battery including a receptacle for charging, the battery life at 5%, and a timestamp of Dec. 1, 2000 at 12:01 PM ET. The control unit server 106 can store this information in a log for data retrieval purposes. In some implementations, the control unit server 106 may not receive battery life information from a device. In response to not receiving the battery life information from the device, the control unit server 106 may transmit a request to the remote server 168 to provide a drone to charge the device that is not transmitting the battery life information. This may be the case for devices that typically report battery life information on a periodic basis, and suddenly stops reporting battery life information.

In response to receiving the corresponding battery life and determining that the corresponding battery life is below the battery level threshold, the control unit server 106 generates a notification for recharging the batteries. In particular, the generated notification can include the device that requires charging, a type of charging for the device, the address of the corresponding monitored property, the battery level of the device that needs charging, and a location of the device that needs charging in the monitored property. In some implementations, the control unit server 106 can transmit this information to the remote server 168 such that the remote server 168 generates this notification. In other implementations, the control unit server 106 can generate this notification and transmit this notification to the remote server 168 to provide to a particular drone.

In addition, the control unit server 106 transmits a notification to the client device 118 to indicate to the user that the battery life of a particular device is low. For example, message 120, which is displayed on the screen of client device 118, recites "camera battery life low." In response, the property owner 122 may interact with the smart home application on the client device 118 indicating that he will replace the batteries of the camera. For example, another message may be displayed on the client device 118 requesting if the property owner 122 wishes to replace the batteries, and the property owner 122 can indicate he intends to replace the batteries. In another example, the property owner 122 can indicate he does not wish to replace the batteries for one or more reasons. In response, the client device 118 transmits this indication from the property owner 122 to the control unit server 106. If the control unit server 106 determines the property owner 122 wishes to replace the batteries himself/herself, the control unit server 106 waits to receive a status update from the corresponding device regarding its battery life. Alternatively, if the control unit server 106 determines the property owner 122 does not wish to replace the battery himself/herself, the control unit server 106 transmits a request 164 to the remote server 168. Alternatively, the control unit server 106 generates and transmits a notification 185 to the remote server 168 to provide to a particular drone for charging the batteries of the depleted device.

In some implementations, the request 164 indicates to the remote server 168 that a device located in a monitored property requires battery charging. In addition, the request 164 includes information corresponding to the device that needs recharging. For example, the information includes the device type, the device model, the address of the corresponding monitored property, the battery strength of the device that needs charging, and a location of the device that needs charging in the monitored property. In some implementations, the remote server 168 processes the received request 164 to determine resources for responding to the request. In particular, based on the type of information in the request 164, the remote server 168 determines a drone to send to the device from the drone-docking system 172. For example, if the device indicated in the request 164 requires charging using a receptacle, the remote server 168 can instruct the first active drone from its launching order for charging using receptacles to power the device. In another example, if the device indicated in the request 164 requires charging by the drone acting as the replaceable battery, the remote server 168 can instruct the first active drone from its launching order for charging by acting as the replaceable battery. In other implementations, the control unit server 106 determines the resources for responding to the battery recharging for a particular device.

In some implementations, the remote server 168 transmits a notification 185 to the determined drone over the antenna 174. In particular, the remote server 168 generates the notification 185 that includes instructions for the determined drone, such as drone 176, to power on, GPS navigational coordinates for the determined drone to fly from its starting location at docking station 178 to the device 156 that requires charging, and an instruction whether to fly to another device to charge after charging device 156. For example, the notification 185 includes a status message for the drone 176 to "POWERON," GPS navigational coordinates from (38.39771, −77.03656) to (38.88949, −77.03536) with one or more GPS navigational points in-between, and a status message for the drone 176 to move to the next device "CONTINUEPOWER." The drone 176 powers on and flies to the device 156 for charging. In some implementations, the control unit server 106 may generate the notification 185 to provide to the drone.

In some implementations, the drone 176 flies to the device 156 by following the GPS navigational coordinates provided by the remote server 168 or the control unit server 106. The drone 176 includes a GPS device to determine its current GPS position. In addition, the drone 176 includes a processor to compare its current GPS position provided by the GPS device to the GPS navigational coordinates provided by the remote server 168. If the drone 176 veers outside the path provided by the GPS navigational coordinates, the drone 176's processor redirects the drone back on the path. In some implementations, the control unit server 106 generates a map of the area surrounding the monitored property 102. The control unit server 106 provides the generated map to each drone in order for the drone to fly to the device for charging and back to a drone docking station. For example, the control unit server 106 generates the map using computer vision on images captured by stationary cameras located at the monitored property 102, each of the drones, or a combination of both. The generated map includes the various devices in a monitored property that require charging by the drone.

In some implementations, the drone 176 completes the flight along the path provided by the GPS navigational coordinates. At the end of the flight path, the drone 176 should be near receptacle 152 of the device 156. In some implementations, the drone 176 detects the receptacle 152 by wirelessly detecting a magnetic presence within proximity to the device 156. In particular, the receptacle 152 emits a magnetic presence due to its connecting functionality. In other implementations, the drone 176 detects the receptacle 152 using other vision recognition means, such as for example, video recognition. The receptacle 152 may include one or more markings that allow the drone 176 to identify the receptacle with the drone 176's camera. In other implementations, the drone 176 can detect the extendable cable attached to the receptacle 152. The extendable cable may include one or more markings that allow the drone 176 to identify the extendable cable with a camera.

Once the drone 176 detects the presence of the receptacle 152, the drone 176 executes a process for connecting the connector 171 to the receptacle 152. In some implementations, the drone 176 may fail in connecting the connector 171 to the receptacle 152. In particular, a piece of the connector 171 or the receptacle 152 may be broken and not allow for the connecting to occur. Alternatively, the drone 176 may not be able to connect to the receptacle 152 due to incorrect alignment issues. In order to alleviate the alignment issues, the drone 176 can transmit a notification to the control unit server 106 and the remote server 168 alerting of failure to connect. In response to receiving the notification, the control unit server 106 can transmit a notification to the client device 118 of the property owner 118. The notification can indicate of the drone's failure to connect. In response, the property owner 122 can go to the location of device 156 to determine the cause of the connecting issue between the connector 171 of the drone 176 and the receptacle 152. In other implementations, if the drone and the device can both perform wireless charging, then the drone can switch to wireless charging in response to the drone 176 recognizing incorrect alignment issues with the receptacle 152. In particular, wireless charging may be performed faster than charging using the connector 171 and the receptacle 152, and thus, the drone 176 can first check whether the device accepts wireless charging. If the device does not accept wireless charging, then the drone 176 proceeds to connecting with the receptacle 152. In other implementations, the drone first tries to connect with the receptacle 152 before performing wireless charging.

In some implementations, the drone 176 may successfully guide its connector 171 to connect with the receptacle 152. For instance, the drone 176 guides its connector 171 using the magnetic presence detection to assist with connecting magnetically to receptacle 152. The receptacle 152 may include a polarity of magnetic north while the connector 171 of the drone 176 may include a polarity of magnetic south. Alternatively, the receptacle 152 may include a polarity of magnetic south and the connector 171 of the drone 176 may include a polarity of magnetic north. In some implementations, the magnets in each receptacle and each connector can be a weak normal magnet or a strong electromagnet. In some implementations, the drone 176 can use the weak normal magnet for aligning the connector 171 and the receptacle 152. Once the connection is created, the weak normal magnet works in tandem with the clips 202 and 204 and the hooks 214 and 216. In other implementations, the drone 176 can use a strong magnetic connection in lieu of a physical connection between the connector 171 and the receptacle 152 to hold the connection between the drone 176 and the cord holding the receptacle 152.

In other implementations, the connection between the receptacle 152 and the connector 171 may be a different connection type, such as a USB type connection, male to female outlet connection, an HDMI connection, or a SATA connection, to name a few examples. In other implementations, the drone 176 can utilize feedback data from the cameras 114 and the lights 112 of the monitored property 102 to assist in connecting the drone's receptacle 171 to the connector 152. For example, if the drone 176 is not successfully guiding its connector 171 to the receptacle 152, the drone 176 can send an indication to the control unit 106 to brighten the area surrounding the receptacle 152. Additionally, the control unit 106 can send the video feed from the cameras 114 to the drone 176 such that the drone 176 can determine if it needs to move one direction or another to be closer to the receptacle 152.

In some implementations, after the drone 176 docks with the device 156 by connecting its connector 171 to the receptacle 152, the drone 176 powers down its propulsion motor. In particular, powering down the propulsion unit of the drone 176 stops its propellers from spinning to stabilize the drone 176 while it powers the device 156. In some implementations, the drone 176 charges the batteries of device 156 until the battery life is fully charged. For instance, the drone 176 charges the batteries of the camera device 156 using its chargeable batteries. The chargeable batteries hold a sufficient amount of charge to power one or more devices in each of the monitored properties. In response to the drone 176 completing charging the batteries of device 156, the drone 176 transmits an indication to the remote server 168, the corresponding control unit server 106, and client device 118. The indication from the drone 176 indicates that the device 156 is fully charged. In addition, the device 156 can also transmit an indication to the control unit server 106 that indicates a battery life of the device 156 is fully charged to 100%.

In some implementations, the drone 176 can fly inside the monitored property 102. The drone 176 would fly to the device to charge inside the monitored property 102. Upon reaching the device inside the monitored property 102, the drone 176 could use various method to inductively charge the device. In particular, the drone 176 could land on a flat surface above the device and charge the device using a wireless inductive charging method. Alternatively, the drone 176 could use a magnetic tether to connect to a portion of the device and charge using the magnetic tether connection. In other implementations, the device can be outside the monitored property 102.

In some implementations, the drone 176 powers on its propulsion unit once the charging of the device 156 is complete. In particular, the propellers start to spin and the receptacle 171 disconnects from the connector 152. In some implementations, the drone 176 flies to the next device at the monitored property if enough charge exists in the chargeable batteries of the drone 176 for navigating the route to the next device, charging a battery of the next device, and navigating to the drone docking station 172 for recharging. For example, the drone 176 receives instructions from the remote server 168 to fly to another outdoor camera at the monitored property 102. The instructions include data similar to the data found in the notification 185. If the drone 176 has enough battery life to fly to another outdoor camera, fully charge the battery of the other outdoor camera, and return to the drone docking station 172, the control unit server 106 includes data identifying the other outdoor camera in the device charging list and notification, and transmits the device charging list/notification to the drone 176. The drone 176 can then fly to the other device to charge its rechargeable batteries.

In some implementations, the drone 176 may determine its chargeable batteries need recharging. The drone 176 may determine that its chargeable batteries need recharging while charging a device or in the middle of flying to another device to charge. If the drone 176 determines its batteries need recharging, the drone 176 can transmit a notification to the remote server 168 that the drone plans to fly back to the drone docking station 172 to recharge its own batteries and bypass charging the next device on its first charging list. In response, the drone 176 flies back to the drone docking station 172 to recharge its own batteries. In some implementations, the remote server 168 or the control unit server 106 can monitor the battery life of each of the drones flying throughout the monitored property 102 and determine whether the drone is to return to the drone docking station 172 to recharge. If the remote server 168 determines a battery life of the drone, such as drone 176, is below a threshold while the drone is flying, the remote server 168 can transmit a notification to the particular drone. The notification can indicate to bypass charging any of the other subsequent devices and return to the docking station 172 to charge. Additionally, the remote server 168 can then transmit a notification to a drone that is currently fully charged on the drone docking station 172 to fly to the next device that requires charging and to charge the device while the battery depleted drone returns to the docking station 172 for charging.

Additionally, the drone 176 may receive instructions from the remote server 168 to power another device. If the drone 176 determines its rechargeable batteries need charging in response to receiving the instructions from the remote server 168, the drone 176 can transmit a response to the remote server 168 indicating it is returning to the drone docking station 172 for repowering. The remote server 168 can receive the response and transmit an instruction to another drone in the drone docking station 172 to fly to the device to charge its rechargeable batteries.

Once the drone 176 returns to and docks at the drone docking station 172, the drone 176 transmits a notification to the remote server 168 to indicate a status of the drone 176. The status of the drone 176 includes an indication that the drone 176 is docked at the drone docking station 172 at docking station 178 and the rechargeable batteries are charging. The remote server 168 removes the drone 176 from any of its launching order in response to receiving the status message. In some implementations, once the drone 176's rechargeable batteries have fully recharged, the drone 176 transmits another status message to the remote server 168 indicating it is ready to receive instructions to power one or more devices at a monitored property.

In some implementations, drone 184 may be the rechargeable battery used by an outdoor camera device. In this instance, the drone 184 is a battery, and the battery can include a propulsion system built-in that includes a small drone motor. The propulsion system built-in allows the drone 184 to move in various directions by producing thrust using the small drone motor. The drone 184 does not include a connector 171 like drone 176 because drone 184 directly connects to a charging slot of the outdoor camera device. The drone 184 may use similar vision techniques to detect the presence of the charging slot and insert itself in the charging slot in response to detecting the charging slot. The drone 184 functions in a similar manner to the drones with a connector.

In particular, the drone 184 receives instructions from remote server 168 to fly to a device at a monitored property that requires charging. The drone 184 inserts itself into the charging slot of the device so that the device can operate. In some implementations, the drone 184 operates and powers the device until a battery level of the drone 184 reaches or drops below a battery threshold level. For example, when the drone 184's battery level reaches the battery threshold level of 25%, the drone 184 ejects from the camera device and flies back to the drone docking station 172 for charging. In addition, the drone 184 transmits an indication that includes a notification that the drone 184's battery needs recharging and the device that drone 184 was charging. In response to receiving the notification, the remote server 168 can instruct another drone that is a rechargeable battery and is fully charged to launch from its docking station and fly to the device to charge and operate. The remote server 168 tracks which device each drone charges to ensure that all devices that continuously require charging from a drone remained charged.

Figure 2:
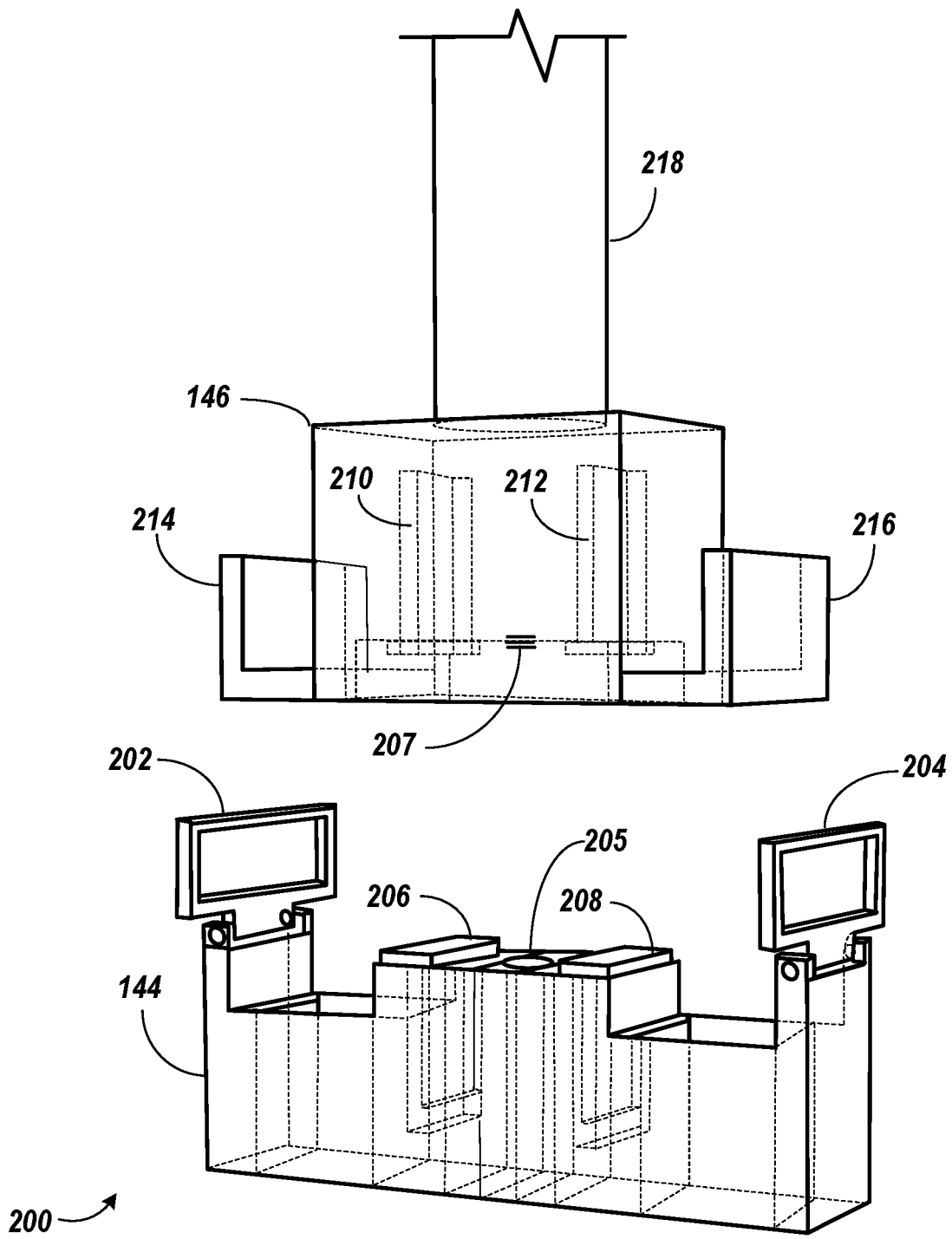
FIGS. 2 through 4 illustrate contextual diagrams of a mechanism for connecting a battery-charging device to a drone.

FIG. 2 is a contextual diagram of an attachable mechanism 200 for connecting a battery-charging device to a drone. In particular, the attachable mechanism 200 includes a connector 144 of a drone and a receptacle 146 of a particular device. The connector 144 of a drone includes a clip 202 and a clip 204 for gripping the receptacle 146. In addition, the connector 144 includes teeth 206 and 208 for attaching to the receptacle 146. The connector 144 includes a fastener 205 for securely fastening the connector 144 to the receptacle 146. The receptacle 146 of the device includes a hook 214 and a hook 216 for the clip 202 and clip 204 to grip, respectively. In addition, the receptacle 146 includes a slot 210 and slot 212 for receiving the teeth 206 and teeth 208 of the connector 144. The receptacle 146 also includes the extended cable 218 portion that connects the device to the receptacle 146. Finally, the receptacle 146 includes a spring 207 for receiving the fastener 205 from the connector 144. In other implementations, the receptacle 146 includes a magnet 207 for receiving the fastener 205 from the connector 144. In this instance, the fastener 205 and the magnet 207 are magnets utilized for aligning the receptacle 146 and the connector 144.

The connector 144 may also include components to detach the clips 202 and 204 from the hooks 214 and 216. For instance, the connector 144 can include a spring-loaded mechanism, a small rotational motor, or one or more electromagnetics to unhinge the clips 202 and 204 from the hooks 214 and 216. In addition, the connector 144 can include a latching mechanism that securely locks the clips 202 and 204 in place while they are attached to the hooks 214 and 216. The latching mechanism unlocks the clips 202 and 204 from the hooks 214 and 216 before the clips 202 and 204 are unhinged from the hooks 214 and 216.

Figure 3:
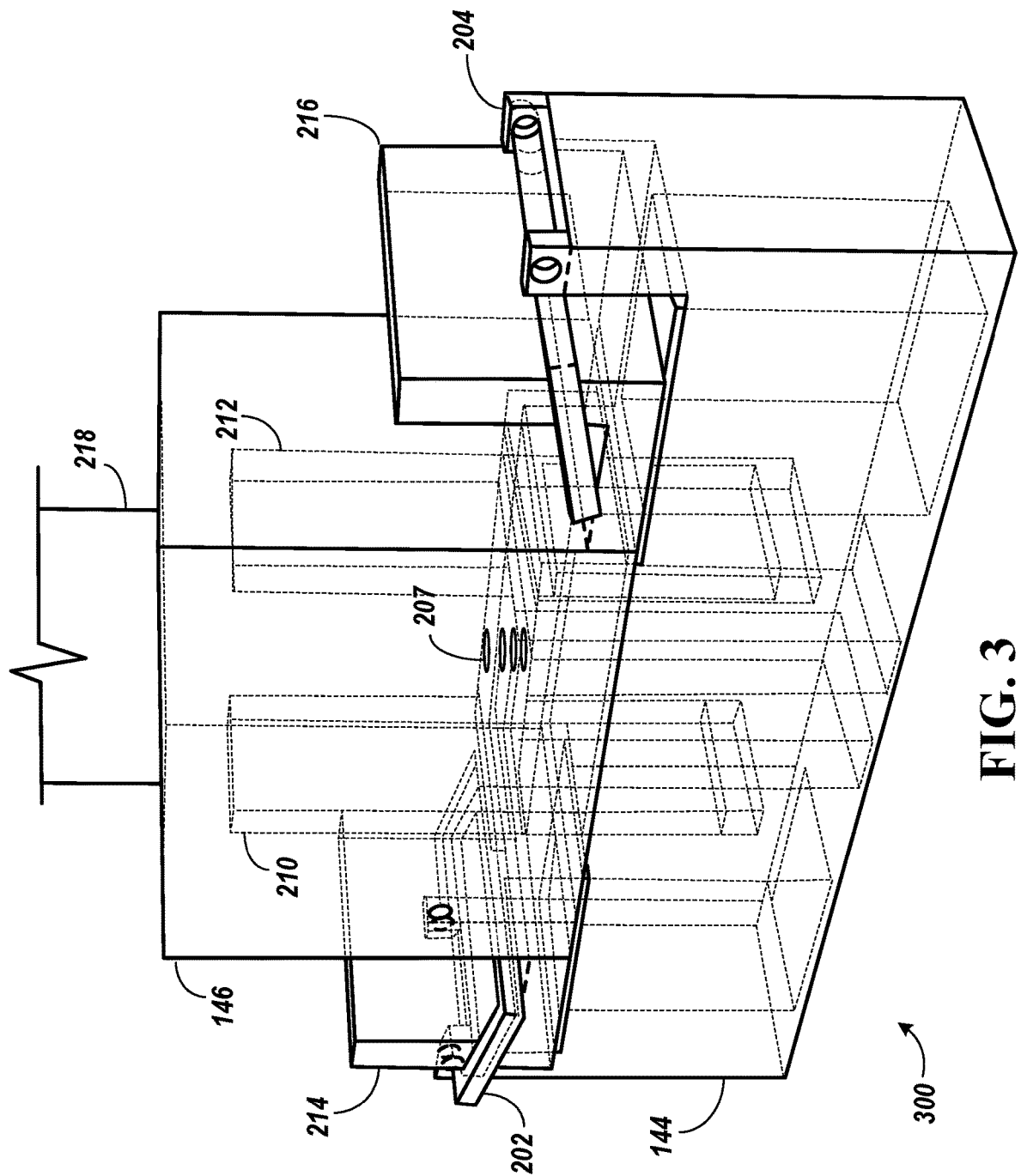

FIG. 3 is another contextual diagram of an attachable mechanism 300 for connecting a battery-charging device to a drone. The attachable mechanism 300 illustrates similar components to the attachable mechanism 200. In addition, the attachable mechanism 300 illustrates how the receptacle 146 of the device and the connector 144 of the drone connect together. In some implementations, the receptacle 146 and the connector 144 are guided together using one or more various methods. For example, the receptacle 146 and the connector 144 may both include magnets of opposite polarity to guide the connection. The receptacle 146 and the connector 144 may be guided to connect using vision recognition by the camera of the drone. In particular, the clips 202 and 204 of the connector 144 grip the hooks 214 and 216 of the receptacle 146. The clips 202 and 204 grip the hooks 214 and 216 by rotating in an inward direction overtop of the hooks to ensure the receptacle 146 remains attached to the connector 144. The drone can utilize the vision recognition system and the magnetic connection to complement each other during the connection. For instance, the vision recognition system can handle the coarse alignment between the connector 144 and the receptacle 146 while the magnetic connection clicks together to fine tune the alignment and minimize any drift movement while the drone attempts to attach to the receptacle 146. The coarse alignment illustrates the first instance of connecting the connector 144 and the receptacle 146. In other implementations, the clips 202 and 204 magnetically connect to the hooks 214 and 216 of the connector 144.

Figure 4:
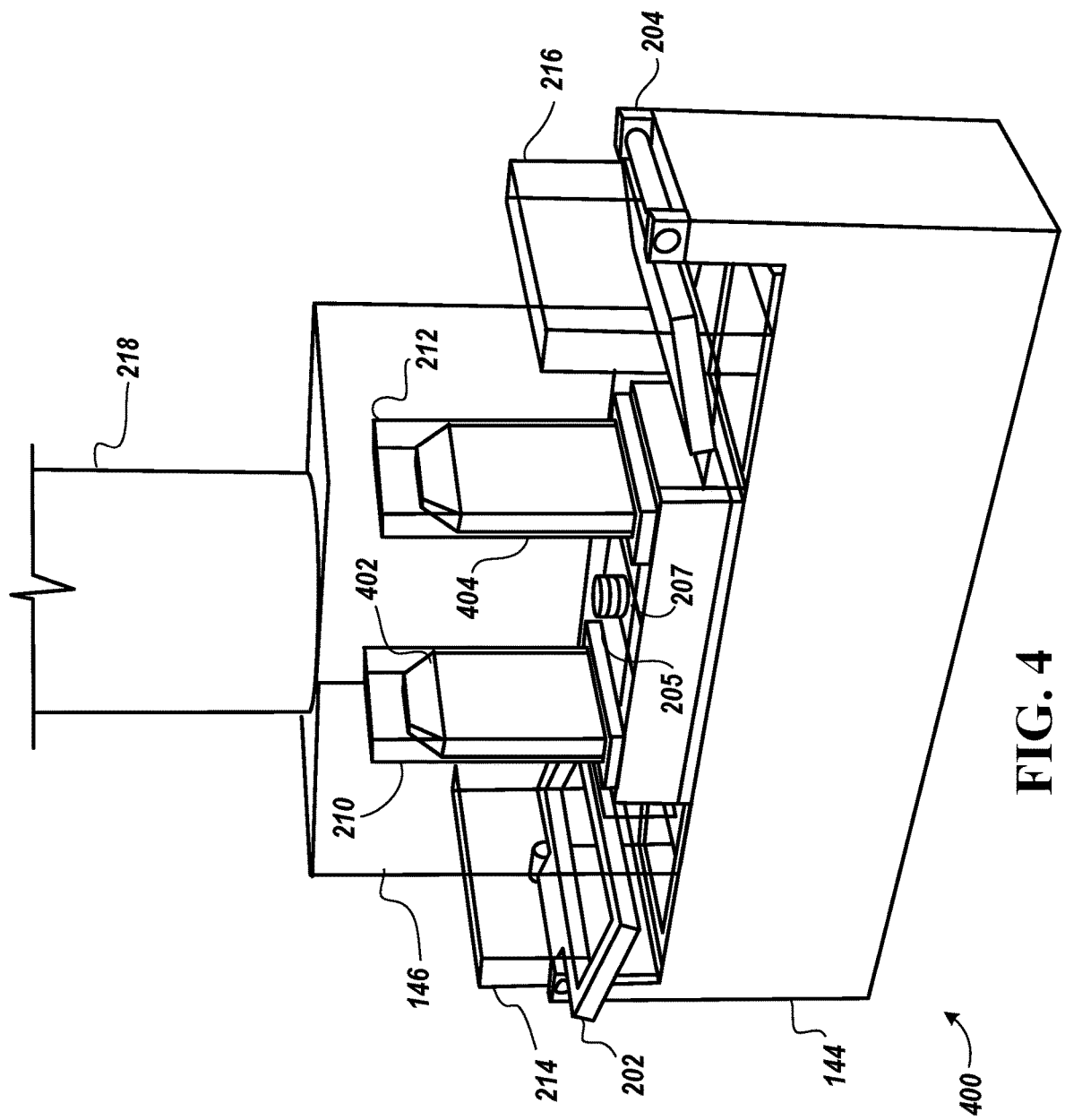

FIG. 4 is another contextual diagram of an attachable mechanism 400 for connecting a battery-charging device to a drone. The attachable mechanism 400 illustrates similar components to the attachable mechanisms 200 and 300 at different stages of the attachment. In addition, the attachable mechanism 400 includes prongs 402 and 404 for securely fastening the connector 144 to the receptacle 146. In some implementations, the prongs 402 and 404 extend in the slots 210 and 212 of the receptacle 146 once the clips 202 and 204 rotate to grip the hooks 214 and 216. In other implementations, the prongs 402 and 404 extend in the receptacle 146 once the connector 144 makes contact with the receptacle 146.

In some implementations, the fastener 205 of the connector 144 is inserted into the spring 207 of the receptacle 146 in response to the prongs 402 and 404 extending into the slots 210 and 212 of the receptacle 146. While the fastener 205 is connected to the spring 207, the spring 207 is stretched in an elastic position. In some implementations, in response to the prongs 402 and 404 extending into the slots 210 and 212 of the receptacle 146 and the spring 207 receiving the fastener 205, the drone recharges the rechargeable batteries of the device through the prongs 402 and 404. In particular, the drone provides power through the prongs 402 and 404. The power travels through the extendable cable 218 of the device to its rechargeable batteries until the rechargeable batteries of the device is full or the charge of the rechargeable batteries of the drone has depleted.

FIG. 5 is a flowchart of an example process 500 for charging a battery at a monitored facility using a drone. Generally, the process 500 includes obtaining battery information from a device; determining a battery level for the device; determining that the battery level is below a battery level threshold; in response to determining that the battery level is below the battery level threshold, generating instructions for a drone to navigate to the device and to charge the battery of the device; transmitting the generated instructions to the drone; and receiving an indication that the drone charged the battery of the device. Alternatively, the process 500 can be used for determining that the battery of a drone for a device needs recharging. The process 500 will be described as being performed by a computer system comprising one or more computers, for example, the system 100 as shown in FIG. 1.

During 502, the system obtains battery information from a device. In particular, the control unit server 106 can receive battery information from an outdoor device, such as a camera. The battery information includes a device type, the type of battery, the battery life, and a timestamp corresponding to the transmitted battery life. For example, the device type includes an outdoor camera, the type of battery including a replaceable drone, the battery level at 5%, and a timestamp of Jan. 2, 2001 at 9:20 PM ET. In other implementations, the control unit server 106 can utilize a projection of the battery level of the device from the monitoring of the expected lifecycle of the battery. The projection of the battery level of the device can be based on the device type, usage patterns of the device, and a time since the battery of the device was last charged. For example, the outdoor camera was charged a month ago and a month has passed since the last charge. The control unit server 106 can analyze usage patterns of the outdoor camera's battery and can determine the battery requires charging on a monthly basis.

During 504, the system determines a battery level for the device. In some implementations, the control unit server determines from the obtained battery information the battery life information. For example, the control unit server 106 determines the battery level for the outdoor camera is at 5%.

During 506, the system determines that the battery level is below a battery level threshold. In some implementations, the control unit server compares the obtained battery level to the battery level threshold. The property owner of the corresponding monitored property may set the battery level threshold through. In other implementations, the control unit server 106 may determine the battery level threshold by analyzing previous battery level data. For instance, the control unit server 106 may determine that devices at the monitored property 102 typically have a safety shut off for when the battery life of each of the devices is set to 5%. Thus, the control unit server 106 may determine through heuristics, such as averaging or using a bell curve determination that the battery level threshold should be set to 10%. In other implementations, the battery level threshold can be preset in a factory.

In some implementations, the system can seek to avoid a scenario in which the devices that require charging or powering outnumber the available number of drones. In this scenario, the drones act as the battery. For example, the monitored property 102 may initially include a greater number of drones that act as the battery than devices that require charging or powering, such five various devices and seven drones (i.e., seven batteries). The system may determine that batteries of three of the drones have died or reached the low battery threshold nearly simultaneously, thus requiring the batteries to recharge. However, the system can recognize this as an issue, as only four batteries remain to charge/power the five devices. In order to avoid this issue, the system can create a requirement that each of the batteries remain above a 50% battery level threshold. When one of the batteries (or drones) crosses below the 50% battery level threshold, that drone flies back to the drone-docking system 172 for recharging and another drone flies to the device to take its place. Thus in this example, the five devices continuously remain charged. The system can use the 50% battery level threshold indication to ensure that the total number of charged drones exceed or meet the number of devices that require charging, and therefore stay ahead of the device requirement issue. In other implementations, the system can monitor an expected life cycle of a battery to determine when to recharge the battery. For example, the control unit server 106 can monitor a time period, a typical life cycle for each of the devices, and a use of each of the devices to determine when to recharge the devices.

During 508, in response to determining that the battery level is below the battery level threshold, the system generates instructions for a drone to navigate to the device and to charge the battery of the device. In some implementations, the control unit server 106 generates a notification for a particular drone to charge/recharge the batteries of the device. The notification includes the device that requires charging, a type of charging required for the device, the address of the corresponding monitored property that includes the device, a battery level of the device that needs charging, and a location of the device in the monitored property. For example, this notification can include indoor camera as the device that requires charging, a replaceable battery drone as the type of charging required for this device, 1111 North Main St., North, Va., 11111 as the address, 5% as the battery level of the outdoor camera, and in the living room of this monitored property. In some implementations, the control unit server 106 converts the address of the monitored property 102 (i.e., 1111 North Main St., North, Va., 11111) to GPS locational coordinates. In addition, the control unit server 106 generates additional GPS locational coordinates from the drone docking station 172 to the GPS locational coordinates of the monitored property 102. These combined GPS coordinates allows the drone to follow a path to fly directly to the monitored property 102 from the drone-docking system 172.

In some implementations, the drone 184 flies to the outdoor camera by following the GPS navigational coordinates provided by the control unit server 106 in the generated instructions. Because the drone 184 is the rechargeable battery for the outdoor camera device, the drone 184 can use one or more vision techniques to detect the presence of the charging slot at the outdoor camera device.

During 510, the system transmits the generated instructions to the drone. In some implementations, the control unit server 106 transmits the generated instructions to a determined drone. The control unit server 106 determines a drone to instruct to charge the batteries of the device based on the information in the generated instructions and a launching order of the drone. For example, the control unit server 106 determines that drone 184 is required to charge the outdoor camera of the monitored property 102 because drone 184 charges as the replaceable battery and is at the top of the launching order. Thus, control unit server 106 transmits the generated instructions to drone 184 over the network 162 and through the remote server 168. In response, the drone 184 powers on and flies to the outdoor camera at the monitored property 102 for charging. The drone 184 flies to the outdoor camera by following the GPS coordinates provided by the control unit server 106 from the generated instructions. Once the drone 184 reaches the final destination of the GPS coordinates, the drone 184 uses image recognition techniques to detect the charging slot. In response to detecting the charging slot, the drone 184 connects to the outdoor camera at the monitored property 102 by inserting itself in the charging slot of the outdoor camera device. The drone 184 charges the batteries of the outdoor camera device until the batteries are fully charged.

During 512, the system receives an indication that the drone charged the battery of the device. In some implementations, when the drone 184 finishes charging the battery of the outdoor camera, the drone 184 transmits an indication to the control unit server corresponding to the monitored property, the client device corresponding to the monitored property, and the remote server 186 indicating that the device is charged. The drone can return to the drone-docking system 172 or continue to the next device to charge at the same monitored property or a different monitored property.

Figure 6:
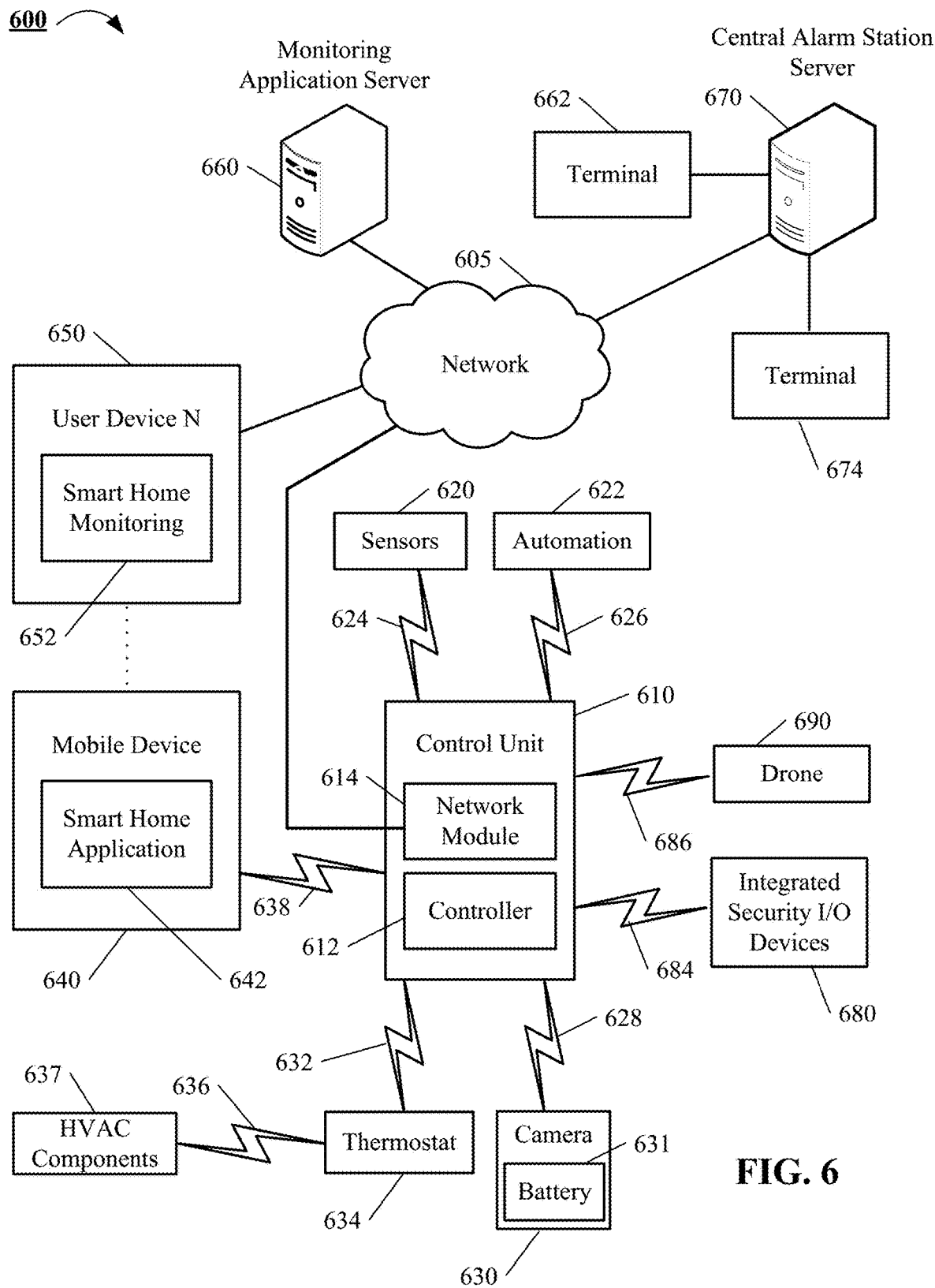
FIG. 6 is block diagram of an example system for charging a battery at a monitored facility that may utilize one or more various components.

FIG. 6 is a block diagram of an example system 600 for charging a battery at a monitored facility that may utilize one or more various components. The electronic system 600 includes a network 605, a control unit 610, one or more user devices 640 and 650, a monitoring application server 660, and a central alarm station server 670. In some examples, the network 605 facilitates communications between the control unit 610, the one or more user devices 640 and 650, the monitoring application server 660, and the central alarm station server 670.

The network 605 is configured to enable exchange of electronic communications between devices connected to the network 605. For example, the network 605 may be configured to enable exchange of electronic communications between the control unit 610, the one or more user devices 640 and 650, the monitoring application server 660, and the central alarm station server 670. The network 605 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 605 may include multiple networks or subnetworks, each of which may include, for example, a wired or wireless data pathway. The network 605 may include a circuit-switched network, a packet-switched data network, or any other network able to carry electronic communications (e.g., data or voice communications). For example, the network 605 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 605 may include one or more networks that include wireless data channels and wireless voice channels. The network 605 may be a wireless network, a broadband network, or a combination of networks including a wireless network and a broadband network.

The control unit 610 includes a controller 612 and a network module 614. The controller 612 is configured to control a control unit monitoring system (e.g., a control unit system) that includes the control unit 610. In some examples, the controller 612 may include a processor or other control circuitry configured to execute instructions of a program that controls operation of a control unit system. In these examples, the controller 612 may be configured to receive input from sensors, flow meters, or other devices included in the control unit system and control operations of devices included in the household (e.g., speakers, lights, doors, etc.). For example, the controller 612 may be configured to control operation of the network module 614 included in the control unit 610.

The network module 614 is a communication device configured to exchange communications over the network 605. The network module 614 may be a wireless communication module configured to exchange wireless communications over the network 605. For example, the network module 614 may be a wireless communication device configured to exchange communications over a wireless data channel and a wireless voice channel. In this example, the network module 614 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 614 also may be a wired communication module configured to exchange communications over the network 605 using a wired connection. For instance, the network module 614 may be a modem, a network interface card, or another type of network interface device. The network module 614 may be an Ethernet network card configured to enable the control unit 610 to communicate over a local area network and/or the Internet. The network module 614 also may be a voiceband modem configured to enable the alarm panel to communicate over the telephone lines of Plain Old Telephone Systems (POTS).

The control unit system that includes the control unit 610 includes one or more sensors. For example, the monitoring system may include multiple sensors 620. The sensors 620 may include a lock sensor, a contact sensor, a motion sensor, or any other type of sensor included in a control unit system. The sensors 620 also may include an environmental sensor, such as a temperature sensor, a water sensor, a rain sensor, a wind sensor, a light sensor, a smoke detector, a carbon monoxide detector, an air quality sensor, etc. The sensors 620 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 620 may include a radio-frequency identification (RFID) sensor that identifies a particular article that includes a pre-assigned RFID tag.

The control unit 610 communicates with the module 622 and the camera 630 to perform monitoring. The module 622 is connected to one or more devices that enable home automation control. For instance, the module 622 may be connected to one or more lighting systems and may be configured to control operation of the one or more lighting systems. Also, the module 622 may be connected to one or more electronic locks at the property and may be configured to control operation of the one or more electronic locks (e.g., control Z-Wave locks using wireless communications in the Z-Wave protocol. Further, the module 622 may be connected to one or more appliances at the property and may be configured to control operation of the one or more appliances. The module 622 may include multiple modules that are each specific to the type of device being controlled in an automated manner. The module 622 may control the one or more devices based on commands received from the control unit 610. For instance, the module 622 may cause a lighting system to illuminate an area to provide a better image of the area when captured by a camera 630. The camera 630 can include one or more batteries 631 that require charging. A drone 690 can be used to charge the batteries 631 of the camera 630. In particular, the drone 690 can act as the battery 631 of the camera 630. Alternatively, the drone 690 can connect to a receptacle that connects to the battery 630 for charging.

The camera 630 may be a video/photographic camera or other type of optical sensing device configured to capture images. For instance, the camera 630 may be configured to capture images of an area within a building or within a residential facility 102 monitored by the control unit 610. The camera 630 may be configured to capture single, static images of the area and also video images of the area in which multiple images of the area are captured at a relatively high frequency (e.g., thirty images per second). The camera 630 may be controlled based on commands received from the control unit 610.

The camera 630 may be triggered by several different types of techniques. For instance, a Passive Infra-Red (PIR) motion sensor may be built into the camera 630 and used to trigger the camera 630 to capture one or more images when motion is detected. The camera 630 also may include a microwave motion sensor built into the camera and used to trigger the camera 630 to capture one or more images when motion is detected. The camera 630 may have a "normally open" or "normally closed" digital input that can trigger capture of one or more images when external sensors (e.g., the sensors 620, PIR, door/window, etc.) detect motion or other events. In some implementations, the camera 630 receives a command to capture an image when external devices detect motion or another potential alarm event. The camera 630 may receive the command from the controller 612 or directly from one of the sensors 620.

In some examples, the camera 630 triggers integrated or external illuminators (e.g., Infra-Red, Z-wave controlled "white" lights, lights controlled by the module 622, etc.) to improve image quality when the scene is dark. An integrated or separate light sensor may be used to determine if illumination is desired and may result in increased image quality.

The camera 630 may be programmed with any combination of time/day schedules, system "arming state", or other variables to determine whether images should be captured or not when triggers occur. The camera 630 may enter a low-power mode when not capturing images. In this case, the camera 630 may wake periodically to check for inbound messages from the controller 612. The camera 630 may be powered by internal, replaceable batteries if located remotely from the control unit 610. The camera 630 may employ a small solar cell to recharge the battery when light is available. Alternatively, the camera 630 may be powered by the controller's 612 power supply if the camera 630 is co-located with the controller 612.

In some implementations, the camera 630 communicates directly with the monitoring application server 660 over the Internet. In these implementations, image data captured by the camera 630 does not pass through the control unit 610 and the camera 630 receives commands related to operation from the monitoring application server 660.

The system 600 also includes thermostat 634 to perform dynamic environmental control at the property. The thermostat 634 is configured to monitor temperature and/or energy consumption of an HVAC system associated with the thermostat 634, and is further configured to provide control of environmental (e.g., temperature) settings. In some implementations, the thermostat 634 can additionally or alternatively receive data relating to activity at a property and/or environmental data at a property, e.g., at various locations indoors and outdoors at the property. The thermostat 634 can directly measure energy consumption of the HVAC system associated with the thermostat, or can estimate energy consumption of the HVAC system associated with the thermostat 634, for example, based on detected usage of one or more components of the HVAC system associated with the thermostat 634. The thermostat 634 can communicate temperature and/or energy monitoring information to or from the control unit 610 and can control the environmental (e.g., temperature) settings based on commands received from the control unit 610.

In some implementations, the thermostat 634 is a dynamically programmable thermostat and can be integrated with the control unit 610. For example, the dynamically programmable thermostat 634 can include the control unit 610, e.g., as an internal component to the dynamically programmable thermostat 634. In addition, the control unit 610 can be a gateway device that communicates with the dynamically programmable thermostat 634.

A module 637 is connected to one or more components of an HVAC system associated with a property, and is configured to control operation of the one or more components of the HVAC system. In some implementations, the module 637 is also configured to monitor energy consumption of the HVAC system components, for example, by directly measuring the energy consumption of the HVAC system components or by estimating the energy usage of the one or more HVAC system components based on detecting usage of components of the HVAC system. The module 637 can communicate energy monitoring information and the state of the HVAC system components to the thermostat 634 and can control the one or more components of the HVAC system based on commands received from the thermostat 634.

In some examples, the system 600 further includes one or more robotic devices. The robotic devices may be any type of robots that are capable of moving and taking actions that assist in security monitoring. For example, the robotic devices may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the system 600 for use in appropriate circumstances. For instance, a robotic vacuum cleaner device may be associated with the monitoring system 600 as one of the robotic devices and may be controlled to take action responsive to monitoring system events.

In some examples, the robotic devices automatically navigate within a property. In these examples, the robotic devices include sensors and control processors that guide movement of the robotic devices within the property. For instance, the robotic devices may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices may store data that describes attributes of the property. For instance, the robotic devices may store a floorplan and/or a three-dimensional model of the property that enables the robotic devices to navigate the property. During initial configuration, the robotic devices may receive the data describing attributes of the property, determine a frame of reference to the data (e.g., a home or reference location in the property), and navigate the property based on the frame of reference and the data describing attributes of the property. Further, initial configuration of the robotic devices also may include learning of one or more navigation patterns in which a user provides input to control the robotic devices to perform a specific navigation action (e.g., fly to an upstairs bedroom and spin around while capturing video and then return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, and/or any type of output devices that allow the robotic devices to communicate information to a nearby user.

The robotic devices also may include a communication module that enables the robotic devices to communicate with the control unit 610, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 900 MHz wireless communication module that enables the robotic devices to communicate directly with the control unit 610. Other types of short-range wireless communication protocols, such as Bluetooth, Bluetooth LE, Zwave, Zigbee, etc., may be used to allow the robotic devices to communicate with other devices in the property.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predefined home base or reference locations in the property. The robotic devices may be configured to navigate to the charging stations after completion of tasks needed to be performed for the monitoring system 600. For instance, after completion of a monitoring operation or upon instruction by the control unit 610, the robotic devices may be configured to automatically fly to and land on one of the charging stations. In this regard, the robotic devices may automatically maintain a fully charged battery in a state in which the robotic devices are ready for use by the monitoring system 600.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device may always use a first charging station and a second robotic device may always use a second charging station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use. For instance, when one of the robotic devices has completed an operation or is in need of battery charge, the control unit 610 references a stored table of the occupancy status of each charging station and instructs the robotic device to navigate to the nearest charging station that is unoccupied.

The system 600 further includes one or more integrated security devices 680. The one or more integrated security devices may include any type of device used to provide alerts based on received sensor data. For instance, the one or more control units 610 may provide one or more alerts to the one or more integrated security input/output devices. Additionally, the one or more control units 610 may receive one or more sensor data from the sensors 620 and determine whether to provide an alert to the one or more integrated security input/output devices 680.

The sensors 620, the module 622, the camera 630, the thermostat 634, drone 690, and the integrated security devices 680 communicate with the controller 612 over communication links 624, 626, 628, 632, 684, and 686. The communication links 624, 626, 628, 632, 684, and 686 may be a wired or wireless data pathway configured to transmit signals from the sensors 620, the module 622, the camera 630, the thermostat 634, the drone 690, and the integrated security devices 680 to the controller 612. The sensors 620, the module 622, the camera 630, the thermostat 634, the drone 690, and the integrated security devices 680 may continuously transmit sensed values to the controller 612, periodically transmit sensed values to the controller 612, or transmit sensed values to the controller 612 in response to a change in a sensed value. In some implementations, the drone 690 can communicate with the monitoring application server 660 over network 605. The drone 690 can connect and communicate with the monitoring application server 660 using a Wi-Fi or a cellular connection.

The communication links 624, 626, 628, 632, 684, and 686 may include a local network. The sensors 620, the module 622, the camera 630, the thermostat 634, and the integrated security devices 680, and the controller 612 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 660 is an electronic device configured to provide monitoring services by exchanging electronic communications with the control unit 610, the one or more user devices 640 and 650, and the central alarm station server 670 over the network 605. For example, the monitoring application server 660 may be configured to monitor events (e.g., alarm events) generated by the control unit 610. In this example, the monitoring application server 660 may exchange electronic communications with the network module 614 included in the control unit 610 to receive information regarding events (e.g., alerts) detected by the control unit server 104a. The monitoring application server 660 also may receive information regarding events (e.g., alerts) from the one or more user devices 640 and 650.

In some examples, the monitoring application server 660 may route alert data received from the network module 614 or the one or more user devices 640 and 650 to the central alarm station server 670. For example, the monitoring application server 660 may transmit the alert data to the central alarm station server 670 over the network 605.

The monitoring application server 660 may store sensor and image data received from the monitoring system and perform analysis of sensor and image data received from the monitoring system. Based on the analysis, the monitoring application server 660 may communicate with and control aspects of the control unit 610 or the one or more user devices 640 and 650.

The central alarm station server 670 is an electronic device configured to provide alarm monitoring service by exchanging communications with the control unit 610, the one or more mobile devices 640 and 650, and the monitoring application server 660 over the network 605. For example, the central alarm station server 670 may be configured to monitor alerting events generated by the control unit 610. In this example, the central alarm station server 670 may exchange communications with the network module 614 included in the control unit 610 to receive information regarding alerting events detected by the control unit 610. The central alarm station server 670 also may receive information regarding alerting events from the one or more mobile devices 640 and 650 and/or the monitoring application server 660.

The central alarm station server 670 is connected to multiple terminals 672 and 674. The terminals 672 and 674 may be used by operators to process alerting events. For example, the central alarm station server 670 may route alerting data to the terminals 672 and 674 to enable an operator to process the alerting data. The terminals 672 and 674 may include general-purpose computers (e.g., desktop personal computers, workstations, or laptop computers) that are configured to receive alerting data from a server in the central alarm station server 670 and render a display of information based on the alerting data. For instance, the controller 612 may control the network module 614 to transmit, to the central alarm station server 670, alerting data indicating that a sensor 620 detected motion from a motion sensor via the sensors 620. The central alarm station server 670 may receive the alerting data and route the alerting data to the terminal 672 for processing by an operator associated with the terminal 672. The terminal 672 may render a display to the operator that includes information associated with the alerting event (e.g., the lock sensor data, the motion sensor data, the contact sensor data, etc.) and the operator may handle the alerting event based on the displayed information.

In some implementations, the terminals 672 and 674 may be mobile devices or devices designed for a specific function. Although FIG. 6 illustrates two terminals for brevity, actual implementations may include more (and, perhaps, many more) terminals.

The one or more user devices 640 and 650 are devices that host and display user interfaces. For instance, the user device 640 is a mobile device that hosts one or more native applications (e.g., the smart home application 642). The user device 640 may be a cellular phone or a non-cellular locally networked device with a display. The user device 640 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 640 may perform functions unrelated to the monitoring system, such as placing personal telephone calls, playing music, playing video, displaying pictures, browsing the Internet, maintaining an electronic calendar, etc.

The user device 640 includes a smart home application 642. The smart home application 642 refers to a software/firmware program running on the corresponding mobile device that enables the user interface and features described throughout. The user device 640 may load or install the smart home application 642 based on data received over a network or data received from local media. The smart home application 642 runs on mobile devices platforms, such as iPhone, iPod touch, Blackberry, Google Android, Windows Mobile, etc. The smart home application 642 enables the user device 640 to receive and process image and sensor data from the monitoring system.

The user device 650 may be a general-purpose computer (e.g., a desktop personal computer, a workstation, or a laptop computer) that is configured to communicate with the monitoring application server 660 and/or the control unit 610 over the network 605. The user device 650 may be configured to display a smart home user interface 652 that is generated by the user device 650 or generated by the monitoring application server 660. For example, the user device 650 may be configured to display a user interface (e.g., a web page) provided by the monitoring application server 660 that enables a user to perceive images captured by the camera 630 and/or reports related to the monitoring system. Although FIG. 6 illustrates two user devices for brevity, actual implementations may include more (and, perhaps, many more) or fewer user devices.

In some implementations, the one or more user devices 640 and 650 communicate with and receive monitoring system data from the control unit 610 using the communication link 638. For instance, the one or more user devices 640 and 650 may communicate with the control unit 610 using various local wireless protocols such as Wi-Fi, Bluetooth, Zwave, Zigbee, HomePlug (ethernet over powerline), or wired protocols such as Ethernet and USB, to connect the one or more user devices 640 and 650 to local security and automation equipment. The one or more user devices 640 and 650 may connect locally to the monitoring system and its sensors and other devices. The local connection may improve the speed of status and control communications because communicating through the network 605 with a remote server (e.g., the monitoring application server 660) may be significantly slower.

Although the one or more user devices 640 and 650 are shown as communicating with the control unit 610, the one or more user devices 640 and 650 may communicate directly with the sensors and other devices controlled by the control unit 610. In some implementations, the one or more user devices 640 and 650 replace the control unit 610 and perform the functions of the control unit 610 for local monitoring and long range/offsite communication.

In other implementations, the one or more user devices 640 and 650 receive monitoring system data captured by the control unit 610 through the network 605. The one or more user devices 640, 650 may receive the data from the control unit 610 through the network 605 or the monitoring application server 660 may relay data received from the control unit 610 to the one or more user devices 640 and 650 through the network 605. In this regard, the monitoring application server 660 may facilitate communication between the one or more user devices 640 and 650 and the monitoring system.

In some implementations, the one or more user devices 640 and 650 may be configured to switch whether the one or more user devices 640 and 650 communicate with the control unit 610 directly (e.g., through link 638) or through the monitoring application server 660 (e.g., through network 605) based on a location of the one or more user devices 640 and 650. For instance, when the one or more user devices 640 and 650 are located close to the control unit 610 and in range to communicate directly with the control unit 610, the one or more user devices 640 and 650 use direct communication. When the one or more user devices 640 and 650 are located far from the control unit 610 and not in range to communicate directly with the control unit 610, the one or more user devices 640 and 650 use communication through the monitoring application server 660.

Although the one or more user devices 640 and 650 are shown as being connected to the network 605, in some implementations, the one or more user devices 640 and 650 are not connected to the network 605. In these implementations, the one or more user devices 640 and 650 communicate directly with one or more of the monitoring system components and no network (e.g., Internet) connection or reliance on remote servers is needed.

In some implementations, the one or more user devices 640 and 650 are used in conjunction with only local sensors and/or local devices in a house. In these implementations, the system 600 only includes the one or more user devices 640 and 650, the sensors 620, the module 622, the camera 630, and the robotic devices. The one or more user devices 640 and 650 receive data directly from the sensors 620, the module 622, the camera 630, and the robotic devices and sends data directly to the sensors 620, the module 622, the camera 630, and the robotic devices. The one or more user devices 640, 650 provide the appropriate interfaces/processing to provide visual surveillance and reporting.

In other implementations, the system 600 further includes network 605 and the sensors 620, the module 622, the camera 630, the thermostat 634, and the robotic devices are configured to communicate sensor and image data to the one or more user devices 640 and 650 over network 605 (e.g., the Internet, cellular network, etc.). In yet another implementation, the sensors 620, the module 622, the camera 630, the thermostat 634, and the robotic devices (or a component, such as a bridge/router) are intelligent enough to change the communication pathway from a direct local pathway when the one or more user devices 640 and 650 are in close physical proximity to the sensors 620, the module 622, the camera 630, the thermostat 634, and the robotic devices to a pathway over network 605 when the one or more user devices 640 and 650 are farther from the sensors 620, the module 622, the camera 630, the thermostat 634, and the robotic devices. In some examples, the system leverages GPS information from the one or more user devices 640 and 650 to determine whether the one or more user devices 640 and 650 are close enough to the sensors 620, the module 622, the camera 630, the thermostat 634, and the robotic devices to use the direct local pathway or whether the one or more user devices 640 and 650 are far enough from the sensors 620, the module 622, the camera 630, the thermostat 634, and the robotic devices that the pathway over network 605 is required. In other examples, the system leverages status communications (e.g., pinging) between the one or more user devices 640 and 650 and the sensors 620, the module 622, the camera 630, the thermostat 634, and the robotic devices to determine whether communication using the direct local pathway is possible. If communication using the direct local pathway is possible, the one or more user devices 640 and 650 communicate with the sensors 620, the module 622, the camera 630, the thermostat 634, and the robotic devices using the direct local pathway. If communication using the direct local pathway is not possible, the one or more user devices 640 and 650 communicate with the sensors 620, the module 622, the camera 630, the thermostat 634, and the robotic devices using the pathway over network 605.

In some implementations, the system 600 provides end users with access to images captured by the camera 630 to aid in decision making. The system 600 may transmit the images captured by the camera 630 over a wireless WAN network to the user devices 640 and 650. Because transmission over a wireless WAN network may be relatively expensive, the system 600 uses several techniques to reduce costs while providing access to significant levels of useful visual information.

In some implementations, a state of the monitoring system and other events sensed by the monitoring system may be used to enable/disable video/image recording devices (e.g., the camera 630). In these implementations, the camera 630 may be set to capture images on a periodic basis when the alarm system is armed in an "Away" state, but set not to capture images when the alarm system is armed in a "Stay" state or disarmed. In addition, the camera 630 may be triggered to begin capturing images when the alarm system detects an event, such as an alarm event, a door-opening event for a door that leads to an area within a field of view of the camera 630, or motion in the area within the field of view of the camera 630. In other implementations, the camera 630 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A system comprising:
    one or more battery-powered devices at one or more monitored properties;

one or more drones configured to navigate to and charge the one or more battery-powered devices;

a processor configured to:
- obtain data from a first battery-powered device, a second battery-powered device, and a third battery-powered device, wherein the data for each of the first, the second, and the third battery-powered devices indicates a battery level associated with a corresponding device, and the battery level associated with each of the first, the second, and the third battery-powered devices are below a battery level threshold;
- determine that a battery level of a first drone of the one or more drones is (i) greater than a first amount of power to fully charge a battery of the first battery-powered device and a second amount of power to fully charge a battery of the second battery-powered device, and (ii) not greater than the first amount of power to fully charge the battery of the first battery-powered device plus the second amount of power to fully charge the battery of the second battery-powered device plus a third amount of power to fully charge a battery of the third battery-powered device;
- provide at least one instruction to the first drone to charge the battery of the first battery-powered device and the battery of the second battery-powered device, the at least one instruction comprising data indicative of the first battery-powered device and the second battery-powered device that require charging;
- provide a second instruction to a second drone to charge the battery of the third battery-powered device; and
- receive an indication from the first drone and the second drone that the first battery-powered device and the second battery-powered device have been charged.

2. The system of claim 1, wherein the at least one instruction further comprises navigational data that enables determination of a path for the first drone to travel to and charge the first battery-powered device and the second battery-powered device.

3. The system of claim 1, wherein each of the one or more drones comprise a connector that is configured to connect to a receptacle of each of the one or more battery-powered devices and provide power from a battery to each of the one or more battery-powered devices during charging.

4. The system of claim 1, wherein the processor is configured to:
- receive data indicating historical usage patterns of the first battery-powered device;
- based on the data indicating historical usage patterns and the battery level of the first battery-powered device, determine an expected battery life of the battery of the first battery-powered device; and
- determine the battery level threshold based on the expected battery life of the battery of the first battery-powered device.

5. The system of claim 4, wherein the processor is configured to:
- generate an instruction to provide to the one or more drones to charge the battery of the first battery-powered device, the battery of the second battery-powered device, and the battery of the third battery-powered device.

6. The system of claim 1, wherein the processor is configured to:

- determine that the battery level of the first drone is below a threshold level while the first drone is inroute to charging the battery of the second battery-powered device;
- in response to determining that the battery level of the first drone is below the threshold level, transmit a notification to the first drone to return to a drone docking station and bypass charging the second battery-powered device;
- receive a first notification from the first drone when the first drone has docked at the drone docking station for charging; and
- receive a second notification from the first drone when the first drone has fully charged.

7. The system of claim 1, wherein the processor is configured to:
- determine that the battery level of the first drone is below a threshold level while the first drone is charging the battery of the second battery-powered device;
- in response to determining that the battery level of the first drone is below the threshold level, transmit a notification to the first drone to return to a drone docking station and cease charging the battery of the second battery-powered device; and
- transmit a notification to a third drone at the drone docking station to travel to and finish charging the battery of the second battery-powered device.

8. A computer-implemented method comprising:
- obtaining, by a system comprising one or more drones configured to navigate to and charge one or more battery-powered devices at one or more properties, data from a first battery-powered device, a second battery-powered device, and a third battery-powered device, wherein the data for each of the first, the second, and the third battery-powered devices indicates a battery level associated with a corresponding device, and the battery level associated with each of the first, the second, and the third battery-powered devices are below a battery level threshold;
- determining, by the system, that a battery level of a first drone of the one or more drones is (i) greater than a first amount of power to fully charge a battery of the first battery-powered device and a second amount of power to fully charge a battery of the second battery-powered device, and (ii) not greater than the first amount of power to fully charge the battery of the first battery-powered device plus the second amount of power to fully charge the battery of the second battery-powered device plus a third amount of power to fully charge a battery of the third battery-powered device;
- providing, by the system, at least one instruction to the first drone to charge the battery of the first battery-powered device and the battery of the second battery-powered device, the at least one instruction comprising data indicative of the first battery-powered device and the second battery-powered device that require charging;
- provide a second instruction to a second drone to charge the battery of the third battery-powered device; and
- receiving, by the system, an indication from the first drone and the second drone that the first battery-powered device and the second battery-powered device have been charged.

9. The computer-implemented method of claim 8, wherein the at least one instruction further comprises navigational data that enables determination of a path for the first drone to travel to and charge the first battery-powered device and the second battery-powered device.

10. The computer-implemented method of claim 8, wherein each of the one or more drones comprise a connector that is configured to connect to a receptacle of each of the one or more battery-powered devices and provide power from a battery to each of the one or more battery-powered devices during charging.

11. The computer-implemented method of claim 8, comprising:
receiving, by the system, data indicating historical usage patterns of the first battery-powered device;
based on the data indicating historical usage patterns and the battery level of the first battery-powered device, determine an expected battery life of the battery of the first battery-powered device; and
determining, by the system, the battery level threshold based on the expected battery life of the battery of the first battery-powered device.

12. The computer-implemented method of claim 11, comprising:
generating, by the system, an instruction to provide to the one or more drones to charge the battery of the first battery-powered device, the battery of the second battery-powered device, and the battery of the third battery-powered device.

13. The computer-implemented method of claim 8, comprising:
determining, by the system, that the battery level of the first drone is below a threshold level while the first drone is inroute to charging the battery of the second battery-powered device;
in response to determining that the battery level of the first drone is below the threshold level, transmitting, by the system, a notification to the first drone to return to a drone docking station and bypass charging the second battery-powered device;
receiving, by the system, a first notification from the first drone when the first drone has docked at the drone docking station for charging; and
receiving, by the system, a second notification from the first drone when the first drone has fully charged.

14. The computer-implemented method of claim 8, comprising:
determining, by the system, that the battery level of the first drone is below a threshold level while the first drone is charging the battery of the second battery-powered device;
in response to determining that the battery level of the first drone is below the threshold level, transmitting, by the system, a notification to the first drone to return to a drone docking station and cease charging the battery of the second battery-powered device; and
transmitting, by the system, a notification to a third drone at the drone docking station to travel to and finish charging the battery of the second battery-powered device.

15. A non-transitory computer-readable medium storing software comprising instructions executable by one or more computers which, upon such execution, cause the one or more computers to perform operations comprising:
obtaining, by a system comprising one or more drones configured to navigate to and charge one or more battery-powered devices at one or more properties, data from a first battery-powered device, a second battery-powered device, and a third battery-powered device, wherein the data for each of the first, the second, and the third battery-powered devices indicates a battery level associated with a corresponding device, and the battery level associated with each of the first, the second, and the third battery-powered devices are below a battery level threshold;
determining, by the system, that a battery level of a first drone of the one or more drones is (i) greater than a first amount of power to fully charge a battery of the first battery-powered device and a second amount of power to fully charge a battery of the second battery-powered device, and (ii) not greater than the first amount of power to fully charge the battery of the first battery-powered device plus the second amount of power to fully charge the battery of the second battery-powered device plus a third amount of power to fully charge a battery of the third battery-powered device;
providing, by the system, at least one instruction to the first drone to charge the battery of the first battery-powered device and the battery of the second battery-powered device, the at least one instruction comprising data indicative of the first battery-powered device and the second battery-powered device that require charging;
provide a second instruction to a second drone to charge the battery of the third battery-powered device; and
receiving, by the system, an indication from the first drone and the second drone that the first battery-powered device and the second battery-powered device have been charged.

16. The non-transitory computer-readable medium of claim 15, wherein the at least one instruction further comprises navigational data that enables determination of a path for the first drone to travel to and charge the first battery-powered device and the second battery-powered device.

17. The non-transitory computer-readable medium of claim 15, wherein each of the one or more drones comprise a connector that is configured to connect to a receptacle of each of the one or more battery-powered devices and provide power from a battery to each of the one or more battery-powered devices during charging.

18. The non-transitory computer-readable medium of claim 15, comprising:
receiving, by the system, data indicating historical usage patterns of the first battery-powered device;
based on the data indicating historical usage patterns and the battery level of the first battery-powered device, determine an expected battery life of the battery of the first battery-powered device; and
determining, by the system, the battery level threshold based on the expected battery life of the battery of the first battery-powered device.

\* \* \* \* \*